(12) United States Patent
Lim et al.

(10) Patent No.: US 11,742,516 B2
(45) Date of Patent: Aug. 29, 2023

(54) SECONDARY BATTERY AND METHOD OF MANUFACTURING THE SECONDARY BATTERY

(71) Applicant: SAMSUNG ELECTRONICS CO., LTD., Suwon-si (KR)

(72) Inventors: Sungjin Lim, Suwon-si (KR); Huisu Jeong, Seongnam-si (KR); Jin S. Heo, Suwon-si (KR); Kyounghwan Kim, Seoul (KR); Mokwon Kim, Suwon-si (KR); Hwiyeol Park, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 241 days.

(21) Appl. No.: 17/076,019

(22) Filed: Oct. 21, 2020

(65) Prior Publication Data

US 2021/0126283 A1  Apr. 29, 2021

(30) Foreign Application Priority Data

Oct. 28, 2019 (KR) ........................ 10-2019-0134794

(51) Int. Cl.
*H01M 10/0562* (2010.01)
*H01M 4/04* (2006.01)
(Continued)

(52) U.S. Cl.
CPC ..... *H01M 10/0562* (2013.01); *H01M 4/0471* (2013.01); *H01M 4/131* (2013.01);
(Continued)

(58) Field of Classification Search
CPC .... H01M 4/0471; H01M 4/131; H01M 4/134; H01M 4/364; H01M 4/366; H01M 4/667;
(Continued)

(56) References Cited

U.S. PATENT DOCUMENTS 9,166,253 B2  10/2015  Fujiki et al.
11,424,512 B2 *  8/2022  Ku .......................... H01M 4/133
(Continued)

FOREIGN PATENT DOCUMENTS

KR  1020190085739 A  7/2019

OTHER PUBLICATIONS

Ki Hyun Kima et al., "Characterization of the interface between LiCoO2 and Li7La3Zr2O12 in an all-solid-state rechargeable lithium battery," Journal of Power Sources, Aug. 1, 2010, pp. 764-767, vol. 196.
Yaoyu Ren et al., "Chemical compatibility between garnet-like solid state electrolyte Li6.75La3Zr1.75Ta0.25O12 and major commercial lithium battery cathode materials," ScienceDirect, J Materiomics, Apr. 12, 2016, pp. 256-264, vol. 2.
(Continued)

*Primary Examiner* — Ula C Ruddock
*Assistant Examiner* — Scott J Chmielecki
(74) *Attorney, Agent, or Firm* — Cantor Colburn LLP

(57) ABSTRACT

A solid electrolyte-cathode assembly including a plurality of cathode layers spaced apart from each other in a first direction, and an electrolyte layer including an amorphous solid electrolyte and a crystalline solid electrolyte including a plurality of crystalline solid electrolyte particles, wherein the amorphous solid electrolyte is on a surface of a cathode layer of the plurality of cathode layers and the crystalline solid electrolyte is within the amorphous solid electrolyte.

25 Claims, 28 Drawing Sheets

(51) Int. Cl.
  *H01M 4/131* (2010.01)
  *H01M 4/134* (2010.01)
  *H01M 4/36* (2006.01)
  *H01M 4/66* (2006.01)
  *H01M 10/0585* (2010.01)

(52) U.S. Cl.
  CPC ........... *H01M 4/134* (2013.01); *H01M 4/364* (2013.01); *H01M 4/366* (2013.01); *H01M 4/667* (2013.01); *H01M 10/0585* (2013.01)

(58) Field of Classification Search
  CPC ............... H01M 10/04; H01M 10/052; H01M 10/0525; H01M 10/0562; H01M 10/058; H01M 10/0583; H01M 10/0585; H01M 10/4235; H01M 2004/028; H01M 2220/30; H01M 2300/0068; H01M 2300/0071; H01M 2300/0077; H01M 2300/0091; H01M 2300/0094; Y02E 60/10; Y02P 70/50
  See application file for complete search history.

(56) References Cited

U.S. PATENT DOCUMENTS

| | | | |
|---|---|---|---|
| 2013/0071756 A1* | 3/2013 | Yada | H01M 10/052 429/317 |
| 2016/0028103 A1* | 1/2016 | Yokoyama | H01M 10/056 29/623.5 |
| 2018/0131004 A1* | 5/2018 | Yang | H01M 10/0525 |
| 2018/0375092 A1 | 12/2018 | Park et al. | |
| 2018/0375149 A1 | 12/2018 | Beck et al. | |
| 2018/0375150 A1 | 12/2018 | Yamamoto et al. | |
| 2019/0036107 A1 | 1/2019 | Nagano | |
| 2019/0044186 A1 | 2/2019 | Kim et al. | |
| 2019/0214674 A1 | 7/2019 | Lim et al. | |
| 2022/0359909 A1* | 11/2022 | Lee | H01M 50/143 |

OTHER PUBLICATIONS

The extended European search report dated Mar. 24, 2021 of EP Patent Application No. 20204035.8.

* cited by examiner 100 320

100 310

SECONDARY BATTERY AND METHOD OF MANUFACTURING THE SECONDARY BATTERY

CROSS-REFERENCE TO RELATED APPLICATION

This application claims priority to and the benefit of Korean Patent Application No. 10-2019-0134794, filed on Oct. 28, 2019, in the Korean Intellectual Property Office, the content of which is incorporated herein in its entirety by reference.

BACKGROUND

1. Field

The present disclosure relates to a secondary battery and a method of manufacturing the same.

2. Description of the Related Art

Secondary batteries are rechargeable, unlike primary batteries, and may be used in various electronic devices, e.g., cellular phones, laptop computers, and camcorders. In particular, lithium secondary batteries may feature higher voltage and higher energy density as compared to nickel-cadmium batteries and nickel-hydrogen batteries. Thus, demand for lithium secondary batteries is increasing.

As the types of electronic devices including a secondary battery have become more diversified and related markets have grown, the demand for a secondary battery with improved performance in various aspects, such as increase in energy density, improvement of rate capability, increase in stability and durability, and improvement of flexibility, has increased. Energy density is related to an increase in the capacity of a secondary battery, and rate capability is related to an improvement in the charging speed of a secondary battery. Thus there remains a need for improved battery materials.

SUMMARY

Provided is a solid electrolyte-cathode assembly for a secondary battery including a three-dimensional ("3D") electrode structure and providing improved capacity and enhanced rate capability.

Provided is a method of manufacturing a solid electrolyte-cathode assembly for a secondary battery including a three-dimensional ("3D") electrode structure and providing improved capacity and enhanced rate capability.

Additional aspects will be set forth in part in the description which follows and, in part, will be apparent from the description.

According to an embodiment, a solid electrolyte-cathode assembly for a secondary battery includes a plurality of cathode layers spaced apart from each other in a first direction, and an electrolyte layer including an amorphous solid electrolyte and a crystalline solid electrolyte including a plurality of crystalline solid electrolyte particles, wherein the amorphous solid electrolyte is on a surface of a cathode layer of the plurality of cathode layers and the crystalline solid electrolyte is within the amorphous solid electrolyte.

The crystalline solid electrolyte may be present in the electrolyte layer in an amount of about 10 volume percent (vol %) to about 99 vol %, based on a total volume of the electrolyte layer.

A thickness of the electrolyte layer measured in the first direction may be about 100 nanometers (nm) to about 100 micrometers (μm).

An average particle size of the plurality of crystalline solid electrolyte particles may be about 100 nm to about 100 μm.

A ratio of an average particle size of the plurality of crystalline solid electrolyte particles to a thickness of the electrolyte layer measured in the first direction may be about 0.15:1 to about 0.25:1.

The solid electrolyte-cathode assembly may further include a cathode current collector facing an end of each of the plurality of cathode layers and contacting a portion of each of the plurality of cathode layers, wherein the surface of the cathode layer of the plurality of cathode layers on which the amorphous solid electrolyte material is present may differ from the end of each of the plurality of cathode layers facing the cathode current collector.

Each of the plurality of cathode layers may include a first surface and a second surface opposite to each other, and a third surface and a fourth surface each extending between the first surface and the second surface, wherein each of the third surface and the fourth surface may have a surface area that is less than a surface area of each of the first surface and the second surface, wherein the third surface and the fourth surface may be opposite to each other. A first surface of a first cathode layer and a second surface of a second cathode layer adjacent to the first cathode layer may face each other.

The electrolyte layer may be on the first surface and the second surface of each of the plurality of cathode layers.

A ratio of a thickness of a first portion of the electrolyte layer measured in the first direction to a thickness of a second portion of the electrolyte layer measured in the first direction may be about 0.1:1 to about 1:1, the solid electrolyte-cathode assembly may further include a cathode current collector on which the plurality of cathode layers are arranged, and the first portion of the electrolyte layer may be farther from the cathode current collector than is the second portion of the electrolyte layer in a second direction perpendicular to the first direction.

The crystalline solid electrolyte may include first crystalline solid electrolyte particles and second crystalline solid electrolyte particles having different average particle sizes, and a ratio of an average particle size of the first crystalline solid electrolyte particles to an average particle size of the second crystalline solid electrolyte particles may be about 0.05 to about 0.5.

An on conductivity of the electrolyte layer may be about $10^{-6}$ Siemens per centimeter (S/cm) to about $10^{-4}$ S/cm.

The electrolyte layer may be a product of heat treating at a temperature of about 50° C. to about 700° C.

The crystalline solid electrolyte may include $Li_{3+x}La_3M_2O_{12}$, wherein M is at least one of Te, Nb, or Zr, and $0 \leq x \leq 10$.

The amorphous solid electrolyte may include $Li_{3+x}La_3M_2O_{12}$, wherein M is at least one of Te, Nb, or Zr, and $0 \leq x \leq 10$.

According to an embodiment, a secondary battery includes an anode layer on the solid electrolyte-cathode assembly; and an anode current collector contacting a portion of the anode layer and facing the cathode current collector, wherein the anode layer is on the first surface and the second surface of each of the plurality of cathode layers.

According to an embodiment, a solid electrolyte-cathode assembly for a secondary battery includes a plurality of cathode layers spaced apart from each other in a first direction, and an electrolyte layer on a surface of a cathode layer of the plurality of cathode layers. The electrolyte layer includes a first amorphous solid electrolyte layer on a cathode layer of the plurality of cathode layers, a mixed solid electrolyte layer on the first amorphous solid electrolyte layer, the mixed solid electrolyte later including a plurality of third crystalline solid electrolyte particles in a second amorphous solid electrolyte, and a third amorphous solid electrolyte layer on the mixed solid electrolyte layer.

A ratio of an average particle size of the plurality of third crystalline solid electrolyte particles to a thickness of a sum of the first amorphous solid electrolyte layer and the third amorphous solid electrolyte layer measured in the first direction may be about 0.5:1 to about 1:1.

A plurality of fourth crystalline solid electrolyte particles may be in at least one of the first amorphous solid electrolyte layer, the mixed solid electrolyte layer, or the third amorphous solid electrolyte layer.

A ratio of an average particle size of the plurality of fourth crystalline solid electrolyte particles to an average particle size of the plurality of third crystalline solid electrolyte particles may be about 0.05:1 to about 0.3:1.

According to an embodiment, a secondary battery includes an anode layer on the solid electrolyte-cathode assembly.

According to an embodiment, a method of manufacturing solid electrolyte-cathode assembly for a secondary battery includes arranging a plurality of cathode layers spaced apart from each other in a first direction on a cathode current collector, coating a first amorphous solid electrolyte on a cathode layer of the plurality of cathode layers to provide a first amorphous solid electrolyte-coated cathode layer, heat treating the first amorphous solid electrolyte-coated cathode layer to provide a second amorphous solid electrolyte-coated cathode layer, coating a mixture of a second amorphous solid electrolyte and a crystalline solid electrolyte including a plurality of crystalline solid electrolyte particles on the second amorphous solid electrolyte-coated cathode layer to provide a coated mixture, heat treating the coated mixture to provide a heat-treated mixture, coating a third amorphous solid electrolyte on the heat-treated mixture to provide an amorphous solid electrolyte material, and heat treating the amorphous solid electrolyte material to manufacture the solid electrolyte-cathode assembly.

The heat treating of the first amorphous solid electrolyte-coated cathode layer, the heat treating of the coated mixture, or the heat treating of the amorphous solid electrolyte material each independently may each independently include heat treating at about 50° C. to about 700° C.

The coating of the first amorphous solid electrolyte, the mixture of the second amorphous solid electrolyte and the crystalline solid electrolyte, or the third amorphous solid electrolyte may each independently include spin coating or dip coating.

According to an embodiment, a method of manufacturing a secondary battery, the method includes providing an anode layer; providing the solid electrolyte-cathode assembly of claim 1; and disposing the anode layer on the solid electrolyte-cathode assembly to manufacture the secondary battery.

According to an embodiment, an electrolyte layer of a secondary battery includes an amorphous solid electrolyte; and a plurality of crystalline solid electrolyte particles, wherein the electrolyte layer has a thickness of about 100 nanometers to about 100 micrometers, wherein an average particle size of the plurality of crystalline solid electrolyte particles is about 100 nanometers to about 100 micrometers, and wherein a ratio of the average particle size of the plurality of crystalline solid electrolyte particles to the thickness of the electrolyte layer is about 0.15:1 to about 0.25:1.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
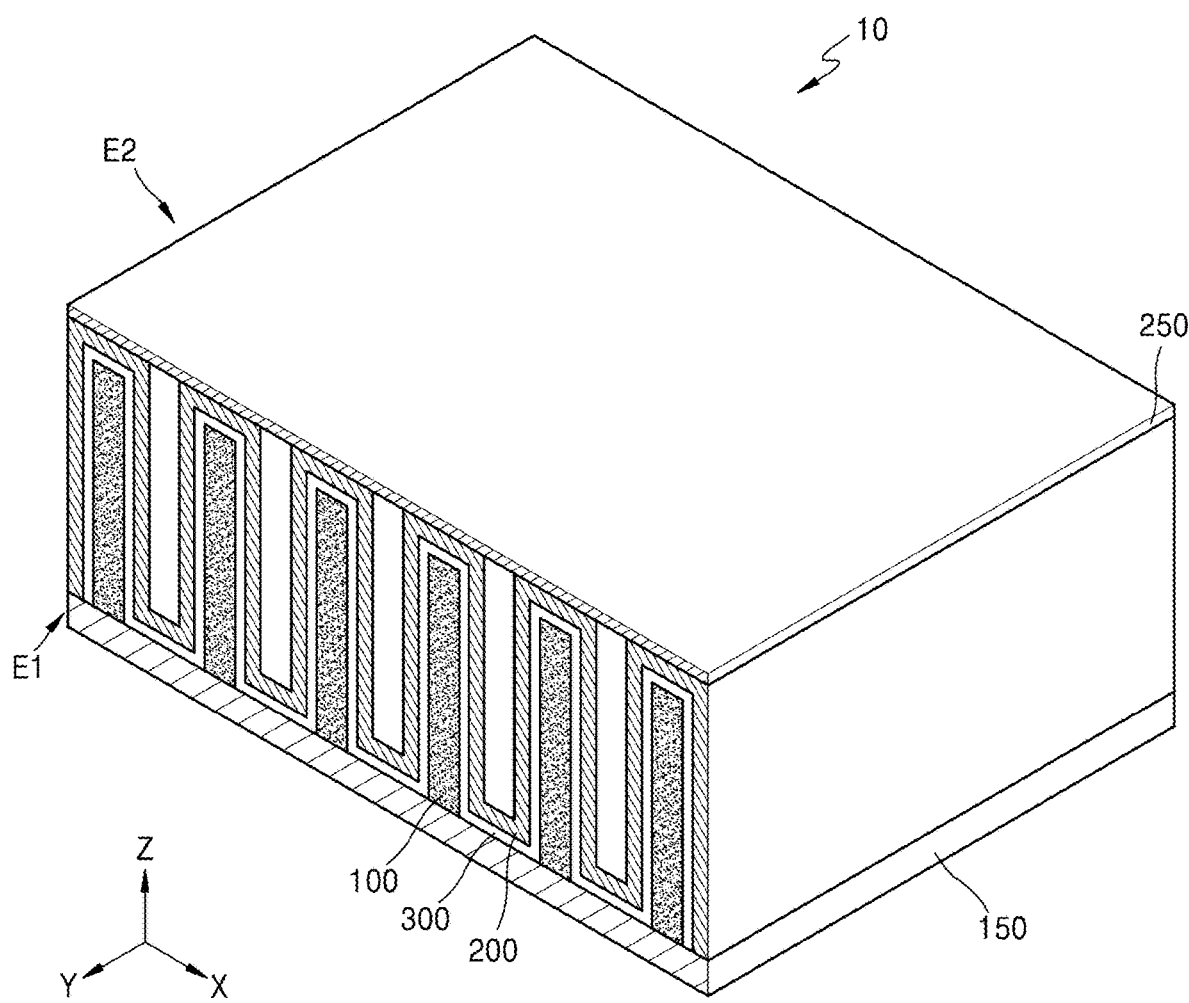
FIG. 1A is a perspective view of an embodiment of a secondary battery.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer, or section from another element, component, region, layer, or section. Thus, "a first element," "component," "region," "layer" or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a three-dimensional ("3D") electrode structure, a secondary battery including a 3D electrode structure, and a method of manufacturing a secondary battery will be described more fully with reference to the accompanying drawings. In the drawings, the widths and thicknesses of layers and regions are exaggerated for clarity of the specification and convenience of explanation. Like reference numerals in the drawings denote like elements.

Figure 1B:
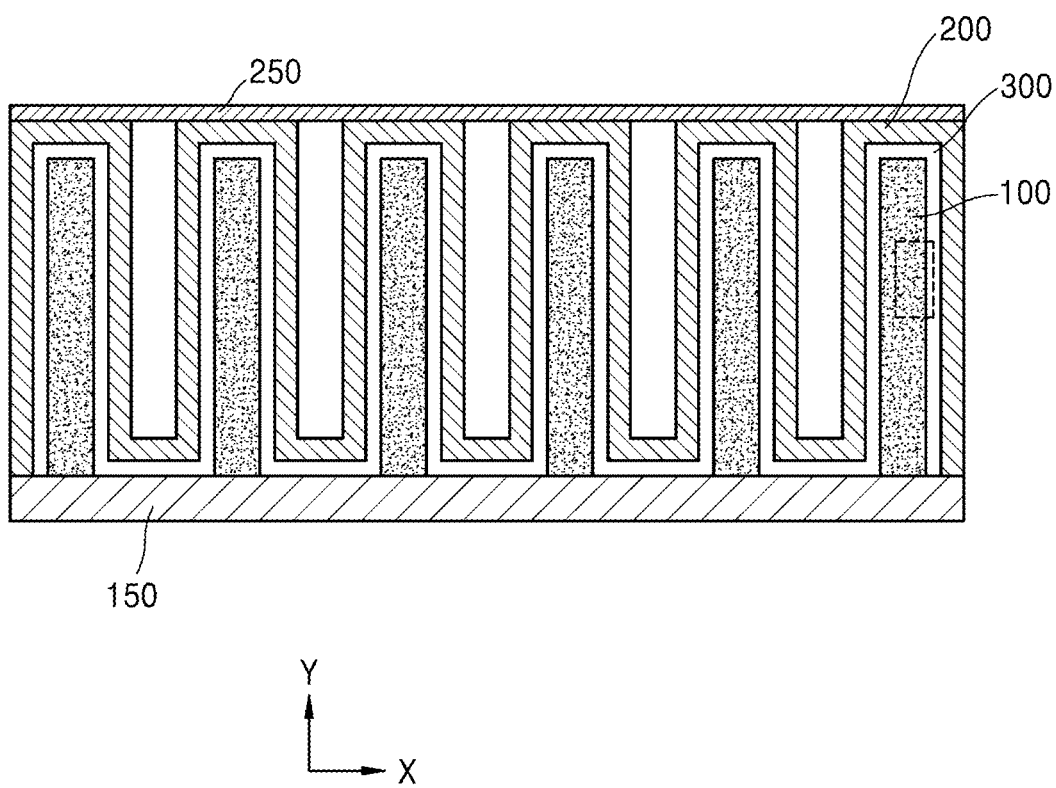
FIG. 1B is a cross-sectional view of an embodiment of a secondary battery.
Figure 1C:
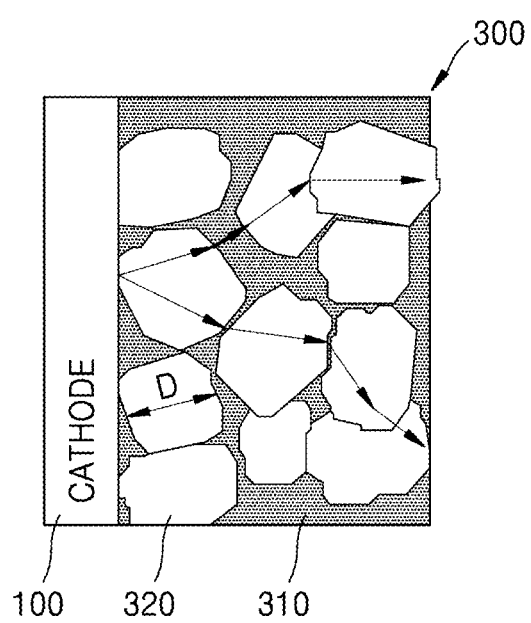
FIG. 1C is an enlarged portion of FIG. 1B.
Figure 1D:
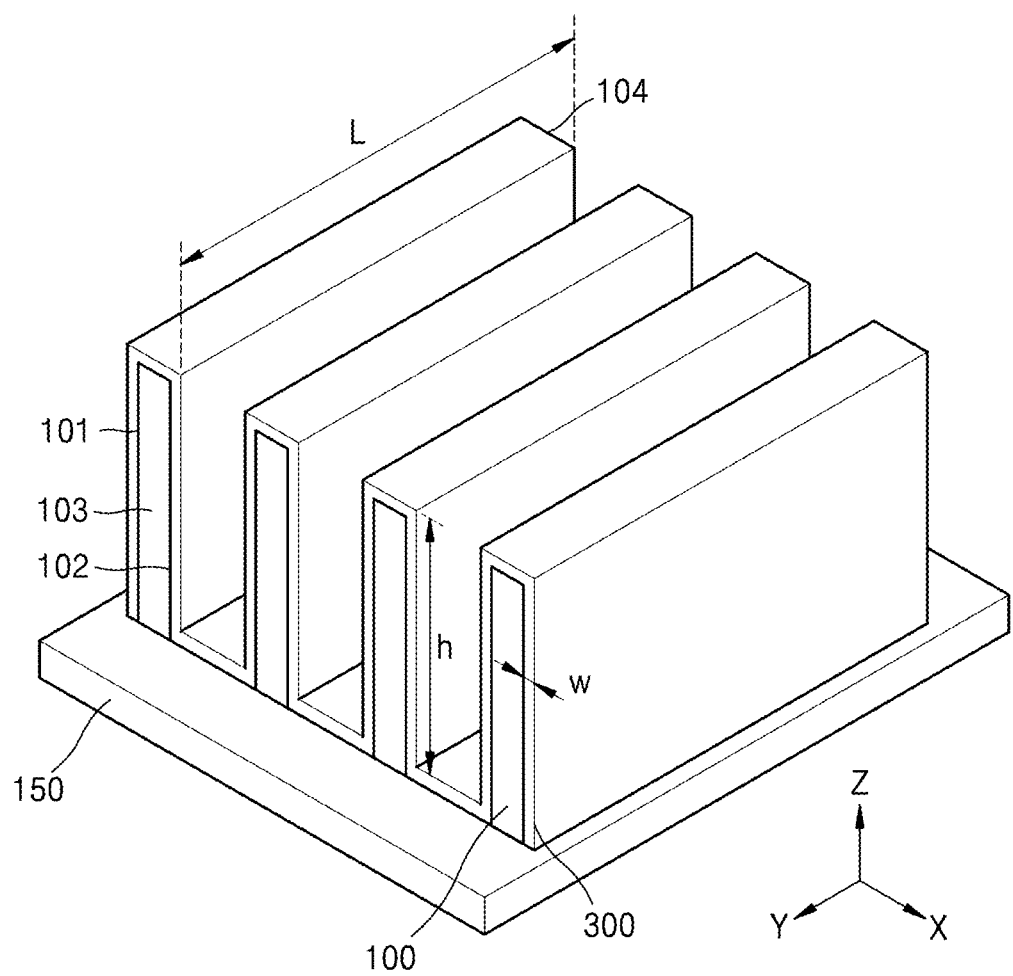
FIG. 1D is a perspective view of an embodiment of cathode layers, an electrolyte layer, and a first current collecting layer included in a secondary battery.
Figure 2A:
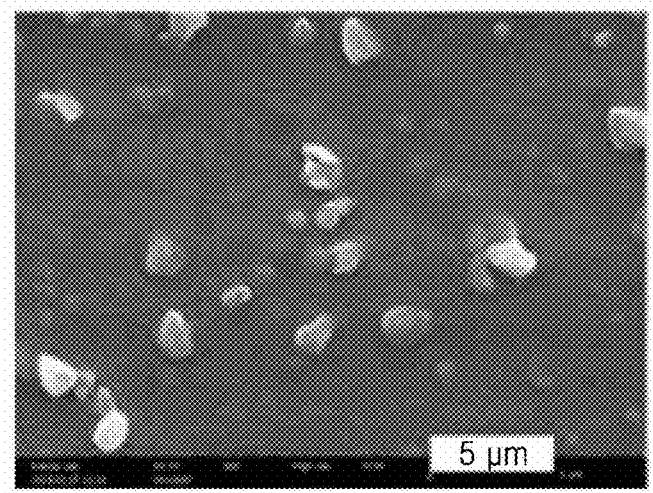
FIG. 2A is a scanning electron microscope ("SEM") image of an embodiment of an electrolyte layer.
Figure 2B:
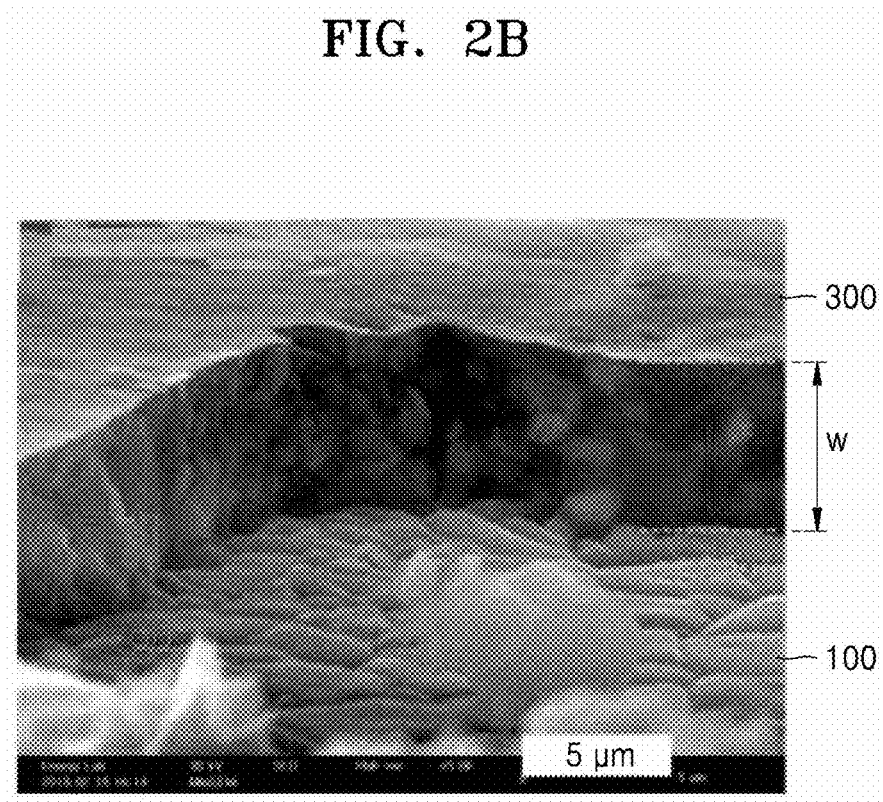
FIG. 2B is an SEM image of an embodiment of an electrolyte layer and cathode layers.

FIG. 1A is a perspective view of a secondary battery 10 according to an embodiment. FIG. 1B is a cross-sectional view of the secondary battery 10 according to an embodiment and FIG. 1C is an enlarged portion of FIG. 1B. FIG. 1D is a perspective view of cathode layers 100, an electrolyte layer 300, and a first current collecting layer, e.g., first current collector, 150 included in the secondary battery 10, according to an embodiment. FIG. 2A is a scanning electron microscope ("SEM") image of the electrolyte layer 300, according to an embodiment. FIG. 2B is an SEM image of the electrolyte layer 300 and the cathode layers 100, according to an embodiment.

Referring to FIGS. 1A through 1D, the secondary battery 10 according to an embodiment may include a first electrode structure E1 including a plurality of cathode layers 100 each having a flat plate-shape, a second electrode structure E2 including an anode layer 200, and the electrolyte layer 300 between the first electrode structure E1 and the second electrode structure E2. For example, as shown in FIG. 1A, a structure of the secondary battery 10 may include a single (electrochemical) cell (or a unit cell). The secondary battery 10 may have a stack structure in which a plurality of single (electrochemical) cells are stacked.

The first electrode structure E1 may include the first current collecting layer 150 and the plurality of cathode layers 100 electrically connected to the first current collecting layer 150. For example, each of the plurality of cathode layers 100 may have a flat plate-shape. The plurality of cathode layers 100 may include a cathode active material. For example, the cathode active material may include a Li-containing oxide. The Li-containing oxide may be an oxide including Li and a transition metal. The Li-containing oxide may be, for example, $LiMO_2$ (M is a metal), wherein M may be at least one of Co, Ni, Mn, or Al. For example, $LiMO_2$ may be $LiCoO_2$. The cathode active material may include a ceramic of a cathode composition, and may be a polycrystalline or a single crystal. For example, the Li-containing oxide may be, for example, $LiMn_2O_4$, $LiFePO_4$, $V_2O_5$, $Li_3V_2(PO_4)_3$, or $xLi_2MnO_3 \cdot (1-x)LiMO_2$ (wherein M is at least one of Co, Ni, Mn, or Al). However, the aforementioned materials of the cathode active material are exemplary, and various other cathode active materials may be used.

The first current collecting layer 150 may be a cathode current collector. The first current collecting layer 150 may have a plate-shape, and, in this case, may be referred to as a current collecting plate. The first current collecting layer 150 may include, for example, at least one conductive material of Cu, Au, Pt, Ag, Zn, Al, Mg, Ti, Fe, Co, Ni, Ge, In, Pd, Y, Zr, or Sn. The first current collecting layer 150 may be a metal layer, or may be a layer including a conductive material other than metal.

Each cathode layer 100 having a plate-shape may have, for example, two side surfaces having a relatively wide, e.g., large, surface area, namely, first and second side surfaces 101 and 102 facing each other, and may have third and fourth side surfaces 103 and 104 facing each other, each extending between the first and second side surfaces 101 and 102 and having relatively smaller surface areas compared to the first and second side surfaces 101 and 102. Stated otherwise, each of the third surface 103 and the fourth surface 104 may have a surface area that is less than a surface area of each of the first surface 101 and the second surface 102. Two cathode layers 100 adjacent to each other may be arranged in such a way that the first side surface 101 and the second side surface 102 face each other.

The electrolyte layer 300 may be arranged on the cathode layers 100 and the first current collecting layer 150. For example, the electrolyte layer 300 may include an amorphous solid electrolyte material 310 and a crystalline solid electrolyte include a plurality of crystalline solid electrolyte materials, e.g., particles, 320. The amorphous solid electrolyte material 310 may be arranged on the first current collecting layer 150 and an outer, e.g., exterior, surface of a cathode layer 100 of the cathode layers 100, and the plurality of crystalline solid electrolyte materials 320 may be mixed within the amorphous solid electrolyte material 310. As used herein, the plurality of crystalline solid electrolyte materials 320 being within the amorphous solid electrolyte material 310 means that the crystalline solid electrolyte materials 320 is surrounded by the amorphous solid electrolyte material 310, the As used herein, the outer or exterior surface of a cathode layer 100 of the cathode layers 100 refers to a surface of a cathode layer 100 of the cathode layers 100 other than a surface of a cathode layer of the cathode layers 100 that contacts the first current collecting layer 150.

The amorphous solid electrolyte material 310 may have a winding form corresponding to the shape of the cathode layers 100. For example, the amorphous solid electrolyte material 310 may be arranged on at least the first side surface 101 and the second side surface 102 of the cathode layers 100, and may have a structure extending between the cathode layers 100 along the thickness direction of the cathode layers 100. However, the amorphous solid electrolyte material 310 may be arranged on the third and fourth side surfaces 103 and 104.

The plurality of crystalline solid electrolyte materials 320 may be mixed at a desired ratio within the amorphous solid electrolyte material 310. For example, the crystalline solid electrolyte, e.g., the plurality of crystalline solid electrolyte materials, e.g., particles, 320, may be present in the electrolyte layer in an amount of about 10 vol % to about 99 vol %, based on a total volume of the electrolyte layer. In an embodiment, the crystalline solid electrolyte, e.g., the plurality of crystalline solid electrolyte materials, e.g., particles, 320, may be present in the electrolyte layer in an amount of about 20 vol % to about 95 vol %, 30 vol % to about 90 vol %, 40 vol % to about 85 vol %, or 50 vol % to about 80 vol %, based on a total volume of the electrolyte layer. For example, the plurality of crystalline solid electrolyte materials 320 may be mixed with the amorphous solid electrolyte material 310 and then may be formed via a low-temperature heat treatment, for example, a heat treatment of about 700 degrees Celsius (° C.) or less, for example, about 50° C. to about 700° C., about 150° C. to about 600° C., or about 350° C. to about 500° C., such that an interfacial resistance between the plurality of crystalline solid electrolyte materials 320 and the amorphous solid electrolyte material 310 may be minimized. Accordingly, the plurality of crystalline solid electrolyte materials 320 may increase an ion conductivity of the electrolyte layer 300 including the amorphous solid electrolyte material 310 mixed with the plurality of crystalline solid electrolyte materials 320, which will be described in greater detail later with reference to FIGS. 3A through 6.

As described herein, the electrolyte layer 300 may include solid electrolyte materials, namely, the amorphous solid electrolyte material 310 and the plurality of crystalline solid electrolyte materials 320. For example, the amorphous solid electrolyte material 310 may include a solid electrolyte material such as $Li_{3+x}La_3M_2O_{12}$ (M is at least one of Te, Nb, or Zr, and $0 \leq x \leq 10$), $Li_3PO_4$, $Li_xTi_y(PO_4)_3$ ($0<x<2$ and $0<y<3$), $Li_xAl_yTi_z(PO_4)_3$ ($0<x<2$, $0<y<1$, and $0<z<3$), $Li_{1+x+y}(Al_aGa_{1-a})_x(Ti_bGe_{1-b})_{2-x}Si_yP_{3-y}O_{12}$ ($0 \leq x \leq 1$, $0 \leq y \leq 1$, $0 \leq a \leq 1$, and $0 \leq b \leq 1$), $Li_xLa_yTiO_3$ ($0<x<2$ and $0<y<3$), $Li_xM_yP_zS_w$-based ceramic (M is at least one of Ge, Si, or Sn, $0<x<4$, $0<y<1$, $0<z<1$, and $0<w<5$), $Li_xN_y$ ($0<x<4$ and $0<y<2$), $Li_xPO_yN_z$ ($0<x<4$, $0<y<5$, and $0<z<4$), $SiS_2$-based ceramic ($Li_xSi_yS_z$, $0<x<3$, $0<y<2$, and $0<z<4$), $P_2S_5$-based ceramic ($Li_xP_yS_z$, $0<x<3$, $0<y<3$, and $0<z<7$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramic, or $Li_xLa_yM_zO_{12}$-based ceramic (M is at least one of Te, Nb, or Zr, $1<x<5$, $0<y<4$, and $0<z<4$). For example, the plurality of crystalline solid electrolyte materials 320 may include a solid electrolyte material such as $Li_{3+x}La_3M_2O_{12}$ (M is at least one of Te, Nb, or Zr, and $0 \leq x \leq 10$), $Li_3PO_4$, $Li_xTi_y(PO_4)_3$ ($0<x<2$ and $0<y<3$), $Li_xAl_yTi_z(PO_4)_3$ ($0<x<2$, $0<y<1$, and $0<z<3$), $Li_{1+x+y}(Al_aGa_{1-a})_x(Ti_bGe_{1-b})_{2-x}Si_yP_{3-y}O_{12}$ ($0 \leq x \leq 1$, $0 \leq y \leq 1$, $0 \leq a \leq 1$, and $0 \leq b \leq 1$), $Li_xLa_yTiO_3$ ($0<x<2$ and $0<y<3$), $Li_xM_yP_zS_w$-based ceramic (M is at least one of Ge, Si, or Sn, $0<x<4$, $0<y<1$, $0<z<1$, and $0<w<5$), $Li_xN_y$ ($0<x<4$ and $0<y<2$), $Li_xPO_yN_z$ ($0<x<4$, $0<y<5$, and $0<z<4$), $SiS_2$-based ceramic ($Li_xSi_yS_z$, $0<x<3$, $0<y<2$, and $0<z<4$), $P_2S_5$-based ceramic ($Li_xP_yS_z$, $0<x<3$, $0<y<3$, and $0<z<7$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramic, or $Li_xLa_yM_zO_{12}$-based ceramic (M is at least one of Te, Nb, or Zr, $1<x<5$, $0<y<4$, and $0<z<4$). However, the materials and types of the amorphous solid electrolyte material 310 and the plurality of crystalline solid electrolyte materials 320 are not limited to those described herein and may vary.

The electrolyte layer 300 may be on, e.g., surround, the plurality of cathode layers 100. For example, the plurality of cathode layers 100 may be arranged on a, e.g., one, surface of the first current collecting layer 150 and may be perpendicular to the one surface of the first current collecting layer 150. The electrolyte layer 300 surrounding each of the plurality of cathode layers 100 may have a width (or thickness) W and a length L that is greater than the width (thickness) W. For example, the electrolyte layer 300 may have the thickness W in an X-axis direction, and may have the length L in a Y-axis direction perpendicular to the thickness W. The electrolyte layer 300 may have a height h in a direction perpendicular to a thickness direction (e.g., the X-axis direction) and a lengthwise direction (e.g., the Y-axis direction), namely, in a direction perpendicular to the first current collecting layer 150. In other words, a length of the electrolyte layer 300 in a Z-axis direction may be a height h. The height h may be greater than the thickness W and may be less than the length L. Stated otherwise, the cathode layers 100 may be spaced apart from each other in a first direction, e.g., the X-axis direction as shown in FIG. 1A, FIG. 1B, FIG. 1C, and FIG. 1D, and as used herein, the thickness direction refers to a direction measured in the first direction.

For example, as shown in FIG. 2B, the electrolyte layer 300 may be arranged on the surface of a cathode layer 100 of the plurality of cathode layers 100 to have a desired thickness, for example, a thickness W of about 100 nm to about 100 μm, for example, about 100 nm to about 90 μm, about 0.5 μm to about 80 μm, about 0.6 μm to about 70 μm, about 0.7 μm to about 60 μm, about 0.8 μm to about 50 μm, about 0.9 μm to about 40 μm, or about 1 μm to about 30 μm. For example, the plurality of crystalline solid electrolyte materials 320 may have an average particle size D of about 100 nm to about 100 μm, for example, about 100 nm to about 10 μm, about 200 nm to about 9 μm, about 300 nm to about 8 μm, about 400 nm to about 7 μm, about 500 nm to about 6 μm, about 600 nm to about 5 μm, or about 700 nm to about 4 μm. The electrolyte layer 300 may be formed by mixing the plurality of crystalline solid electrolyte materials 320 within the amorphous solid electrolyte material 310. A ratio of the average particle size D of the plurality of crystalline solid electrolyte materials 320 with respect to the thickness W of the electrolyte layer 300 may be about 0.15:1 to about 0.25:1, for example, about 0.16:1 to about 0.24:1, about 0.17:1 to about 0.23:1, about 0.18:1 to about 0.22:1, or about 0.19:1 to about 0.21:1. When the average particle size D of the plurality of crystalline solid electrolyte materials 320 with respect to the thickness W of the electrolyte layer 300 has a ratio as described herein, the electrolyte layer 300 may have a relatively smooth surface as shown in FIG. 2A. Accordingly, a contact state between the electrolyte layer 300 and the cathode layers 100 and the anode layer 200 arranged to surround the electrolyte layer 300 may be improved, and pore generation may be decreased or prevented and ion conductivity may also improve. However, the aforementioned specific figures of the thickness W of the electrolyte layer 300 and the average particle size D of the plurality of crystalline solid electrolyte materials 320 are merely exemplary.

The second electrode structure E2 may include the anode layer 200 and a second current collecting layer 250 electrically connected to the anode layer 200. The anode layer 200 may include an anode active material, and the second current collecting layer 250 may be an anode current collecting layer. For example, the anode active material included in the anode layer 200 may include, for example, a Li metal, a carbon-based material, a silicon-based material, or an oxide. The anode current collecting layer may include, for example, at least one conductive material of Cu, Au, Pt, Ag, Zn, Al, Mg, Ti, Fe, Co, Ni, Ge, In, Pd, Y, Zr, or Sn. However, the anode active material and the materials of the anode current collecting layer are not limited thereto.

The second current collecting layer 250 may face the first current collecting layer 150. The anode layer 200 may have a winding form corresponding to the shape of the cathode layers 100 while electrically contacting the second current collecting layer 250. For example, the anode layer 200 may be arranged on at least the first side surface 101 and the second side surface 102 of the cathode layers 100 and may have a structure extending between the cathode layers 100 along the thickness direction of the cathode layers 100. In this case, portions of the anode layer 200 extending between the cathode layers 100 may have a plate shape. Accordingly, the portions of the anode layer 200 extending between the cathode layers 100 may be referred to as "a plurality of anode layer plates". In this case, the cathode layers 100 and the anode layer plates may alternate with each other. The electrolyte layer 300 may be arranged between the cathode layers 100 and the anode layer 200.

The secondary battery 10 may include the first electrode structure E1 as a 3D structure including the plurality of cathode layers 100 perpendicular (or substantially perpendicular) to the first current collecting layer 150 and the second electrode structure E2 including the anode layer 200 and the second current collecting layer 250, and a capacity and energy density of the secondary battery 10 may be greatly increased compared to a secondary battery including a two-dimensional ("2D") electrode structure (i.e., a planar-type structure). A 3D electrode structure may provide a high, e.g., large, active material volume, e.g., a volume of crystalline solid electrolyte present in the electrolyte layer, and a wide, e.g., large, reaction surface area when compared to a planar-type electrode structure, and the 3D electrode structure may be favorable to improvement in the energy density and rate capability of a battery (secondary battery).

However, when the cathode active material included in the cathode layers 100 is sintered to a high density to increase the capacity of the secondary battery 10, the ion conductivity of the cathode layers 100 may be reduced, and the energy density and the rate capability of the secondary battery 10 may be reduced. The secondary battery 10 in which the ion conductivity of the cathode layers 100 is increased by arranging the amorphous solid electrolyte material 310 and the plurality of crystalline solid electrolyte materials 320 in the electrolyte layer 300 will now be described in greater detail.

Figure 3A:
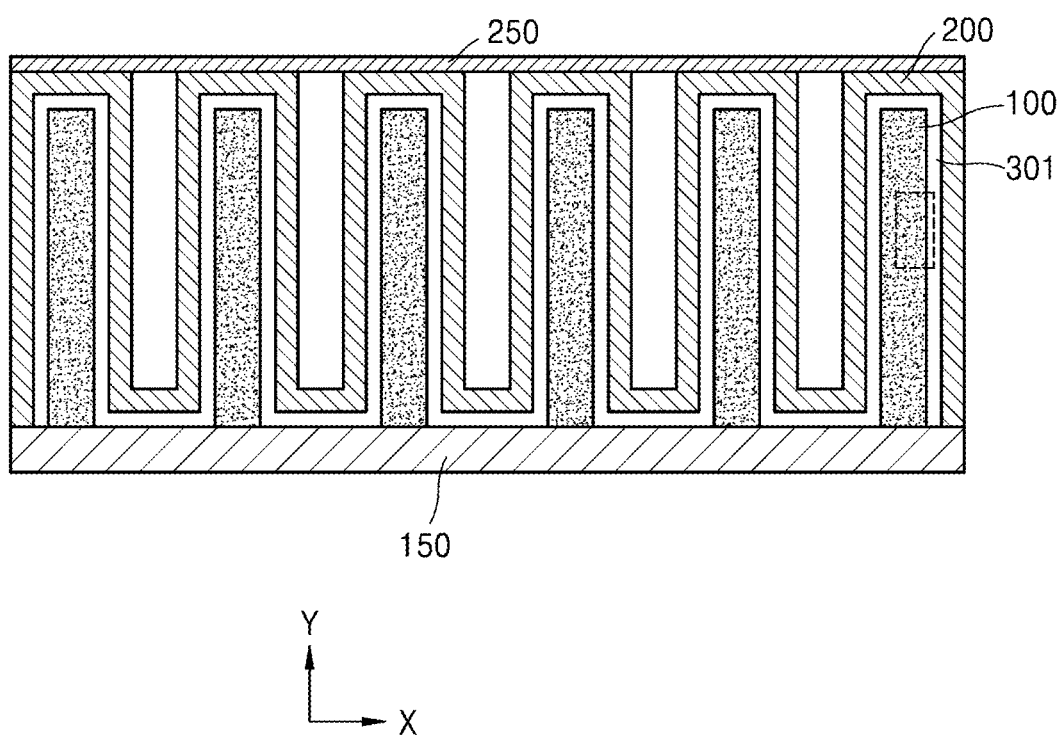
FIG. 3A is a cross-sectional view of a secondary battery according to Comparative Example 1.
Figure 3B:
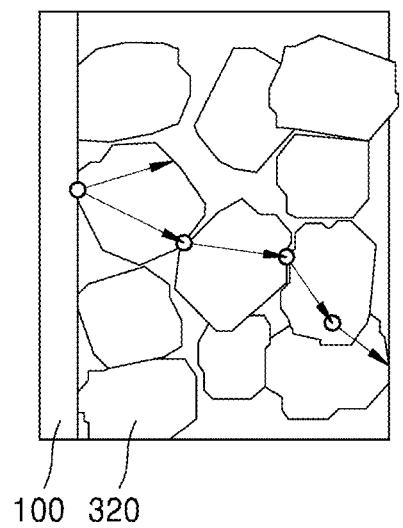
FIG. 3B is an enlarged portion of FIG. 3A.
Figure 3C:
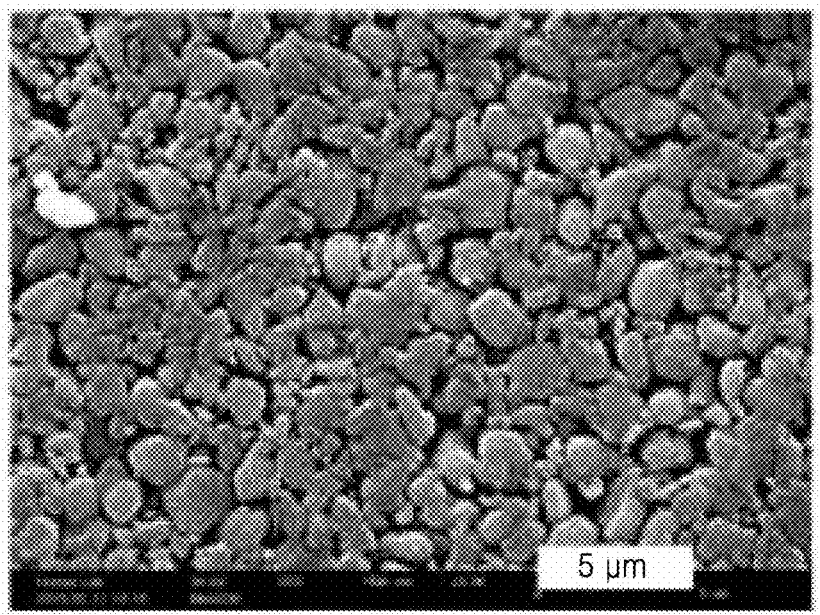
FIG. 3C is an SEM image of an electrolyte layer according to Comparative Example 1.
Figure 4A:
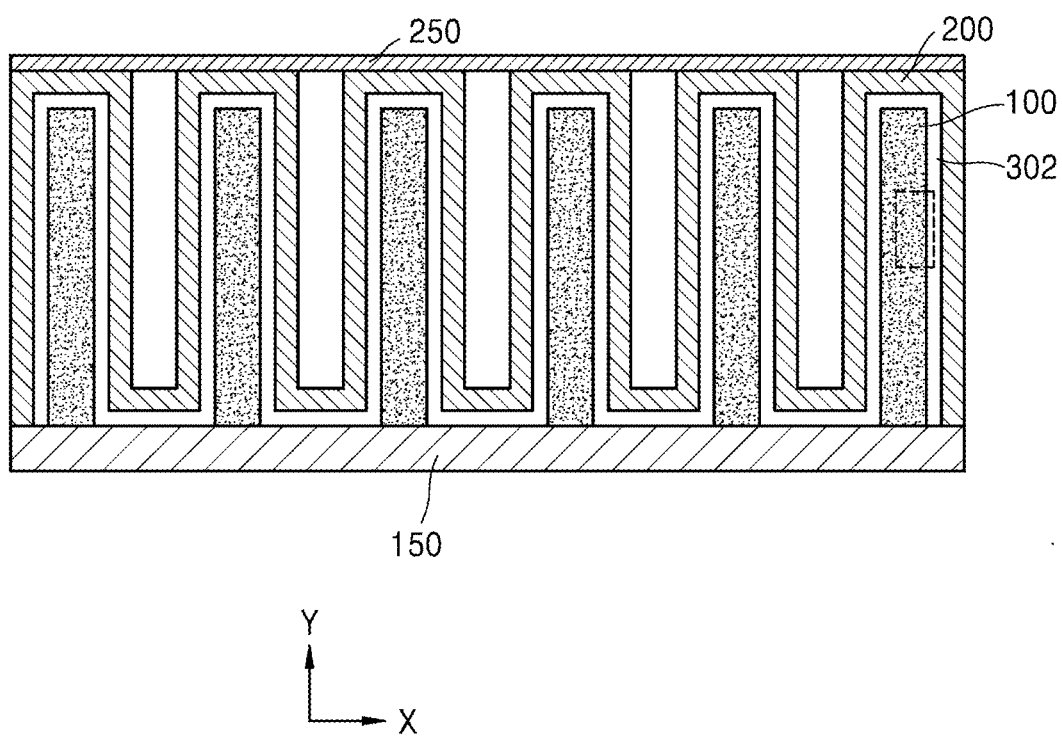
FIG. 4A is a cross-sectional view of a secondary battery according to Comparative Example 2.
Figure 4B:
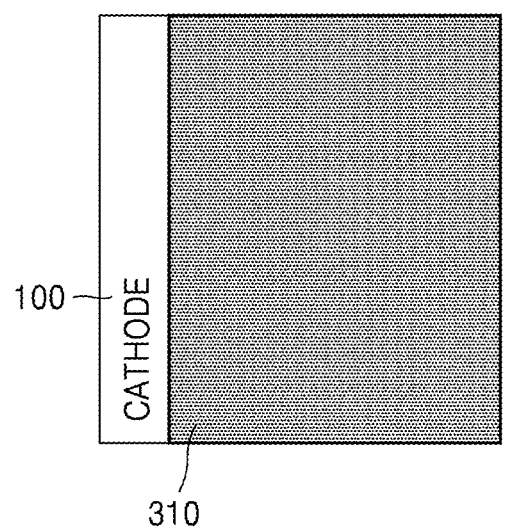
FIG. 4B is an enlarged portion of FIG. 4A.
Figure 4C:
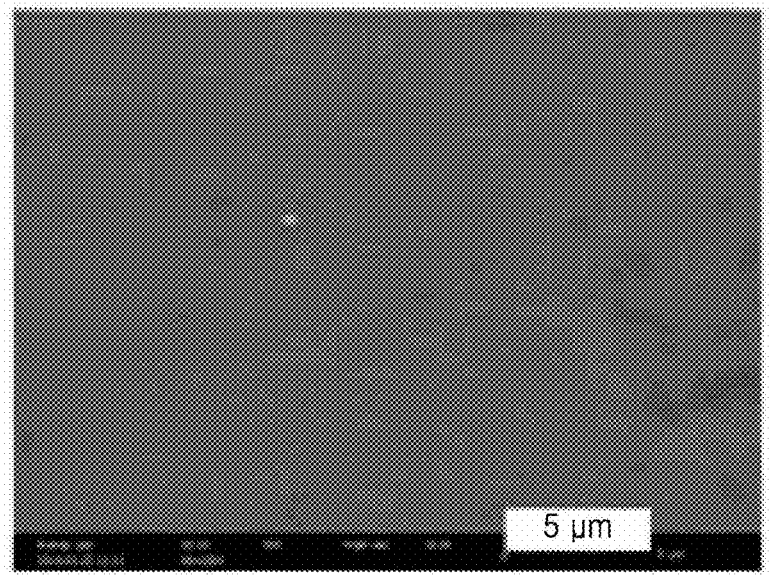
FIG. 4C is an SEM image of an electrolyte layer according to Comparative Example 2.
Figure 5:
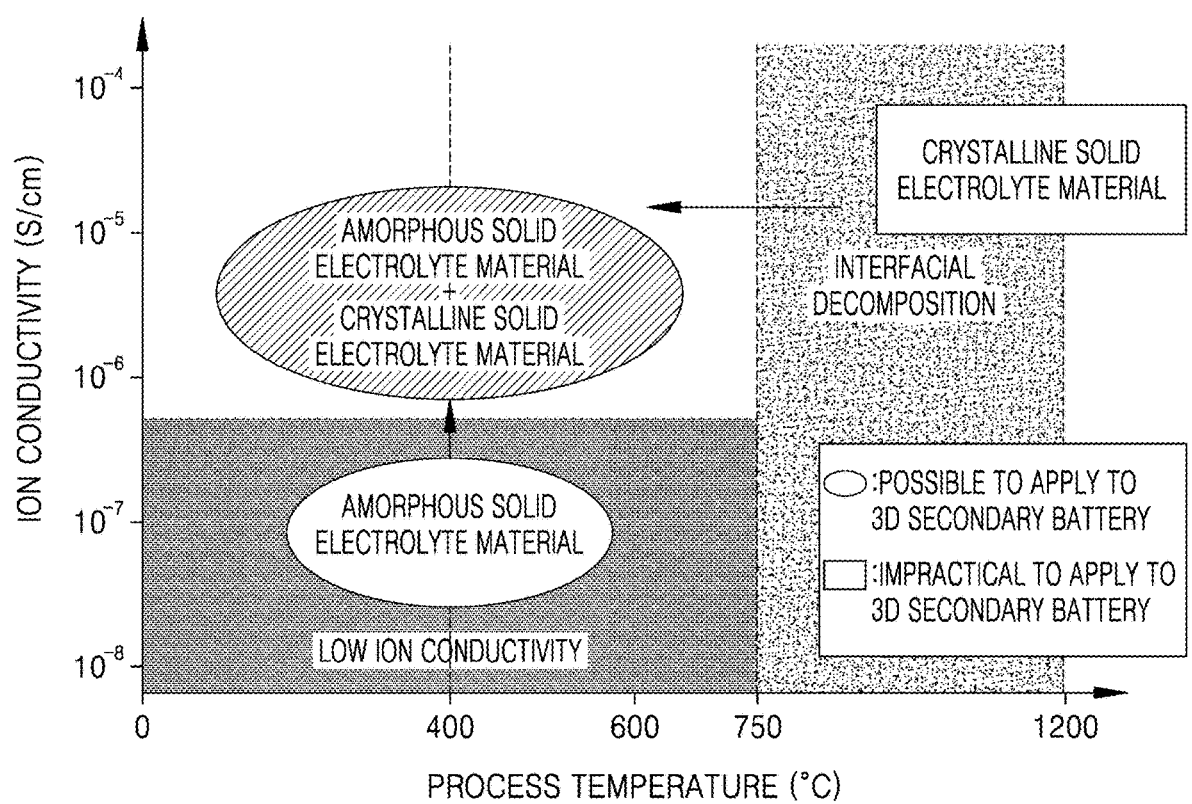
FIG. 5 is a graph of ion conductivity (S/cm) versus process temperature (° C.) showing a correlation between a heat treatment process temperature of an electrolyte layer and ion conductivity thereof.
Figure 6:
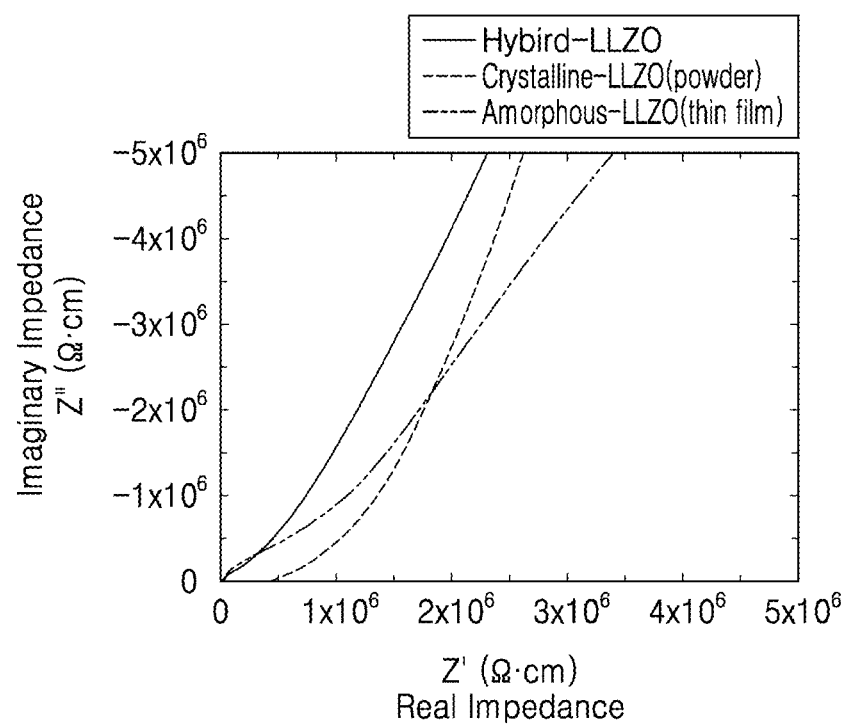
FIG. 6 is a Nyquist plot of imaginary impedance Z" (ohms centimeters (Ω·cm)) versus real impedance Z' (Ω·cm) showing ion conductivities of Comparative Example 1 (Crystalline-$Li_7La_3Zr_2O_{12}$ ("LLZO") (powder)), Comparative Example 2 Amorphous-LLZO (thin film)), and a Hybrid-LLZO embodiment.

FIG. 3A is a cross-sectional view of a secondary battery according to Comparative Example 1 and FIG. 3B is an enlarged portion of FIG. 3A. FIG. 3C is an SEM image of an electrolyte layer 301 according to Comparative Example 1. FIG. 4A is a cross-sectional view of a secondary battery according to Comparative Example 2 and FIG. 4B is an enlarged portion of FIG. 4A. FIG. 4C is an SEM image of an electrolyte layer 302 according to Comparative Example 2. FIG. 5 is a graph showing a correlation between a heat treatment process temperature of an electrolyte layer and ion conductivity thereof. FIG. 6 is a Nyquist plot representing ion conductivities of Comparative Example 1, Comparative Example 2, and a Hybrid-LLZO embodiment.

Referring to FIG. 3A, FIG. 3B, and FIG. 3C, cathode layers 100 according to Comparative Example 1 may be formed by drying active material slurry to form an active material sheet and sintering a cathode active material, for example, $LiCoO_2$ ("LCO"), included in the active material sheet via a sintering process. On the cathode layers 100 obtained by sintering the cathode active material, a plurality of crystalline solid electrolyte materials 320, for example, crystalline $Li_7La_3Zr_2O_{12}$ ("LLZO") powder, may be arranged in a pressing way, e.g., pressing against one another. A high-temperature heat treatment, for example, a heat treatment at a high temperature of about 1,000° C. or greater, for example, about 1,000° C. to about 3,000° C., about 1,200 to about 2,800° C., or about 1,400 to about 2,600, may be applied to the plurality of crystalline solid electrolyte materials 320. In this case, an interfacial decomposition reaction may be generated between the cathode active material included in the cathode layers 100 and the plurality of crystalline solid electrolyte materials 320, and a reaction product (e.g., $Li_2CoO_4$ or $LaCoO_3$) obtained due to the generated interfacial decomposition reaction may greatly increase an interfacial resistance. Accordingly, as shown in FIG. 5, when the electrolyte layer 301 includes only the plurality of crystalline solid electrolyte materials 320, the crystalline solid electrolyte layer may not be suitable for use as the electrolyte layer 300 in a 3D secondary battery.

Referring to FIG. 4A, FIG. 4B, and FIG. 4C, cathode layers 100 according to Comparative Example 2 may be formed by drying active material slurry to form an active material sheet and sintering a cathode active material, for example, $LiCoO_2$ ("LCO"), included in the active material sheet via a sintering process. On the cathode layers 100 obtained by sintering the cathode active material, an amorphous solid electrolyte material 310, for example, a precursor liquid mixture for amorphous $Li_7La_3Zr_2O_{12}$ ("LLZO"), may be arranged along the sidewall of the cathode layers 100 by using a spin coating method. For example, the amorphous solid electrolyte material 310 may undergo a low-temperature heat treatment, for example, a heat treatment at a low temperature of 700° C. or less, for example, about 50° C. to about 700° C., about 150° C. to about 600° C., or about 350° C. to about 500° C. For example, the amorphous solid electrolyte material 310 formed as in Comparative Example 2 may include an ion conductivity that is less than an ion conductivity of crystalline solid electrolyte materials 320, as shown in FIG. 5.

As shown in FIG. 1B and FIG. 1C, the electrolyte layer 300 according to an embodiment may include the crystalline solid electrolyte materials 320 including a relatively high ion conductivity, and the plurality of crystalline solid electrolyte materials 310 may be mixed within the amorphous solid electrolyte material 310. In this case, the amorphous solid electrolyte material 310 and the plurality of crystalline solid electrolyte materials 320 may undergo a low-temperature heat treatment, for example, a heat treatment at a low temperature of 700° C. or less, for example, about 50° C. to about 700° C., about 150° C. to about 600° C., or about 350° C. to about 500° C. The electrolyte layer 300 according to an embodiment may include a higher ion conductivity than Comparative Example 1 and Comparative Example 2, for example, an ion conductivity of about $10^{-6}$ S/cm or greater, for example, about $10^{-6}$ S/cm to about $10^{-4}$ S/cm, about $10^{-6}$ S/cm to about $5\times10^{-5}$ S/cm, or about $5\times10^{-6}$ S/cm to about $1\times10^{-5}$ S/cm.

Referring to FIG. 6, a resistance of a comparative example in which crystalline $Li_7La_3Zr_2O_{12}$ ("LLZO") powder is arranged on the cathode layers 100 in a pressing way and a special heat treatment is not performed is illustrated as a graph. In a case in which crystalline $Li_7La_3Zr_2O_{12}$ ("LLZO") powder having undergone no heat treatments is used, a non-conductivity state in which an ion conductivity is not measured may be confirmed. A resistance of a comparative example in which a precursor liquid mixture for amorphous $Li_7La_3Zr_2O_2$ ("LLZO") is arranged along the sidewall of the cathode layers 100 according to a spin coating method and a low-temperature heat treatment, for example, a heat treatment at a low temperature of 700° C. or less, for example, about 50° C. to about 700° C., about 150° C. to about 600° C., or about 350° C. to about 500° C., is performed is illustrated as a graph. In a case in which a precursor liquid mixture for amorphous $Li_7La_3Zr_2O_{12}$ ("LLZO") is arranged along the sidewall of the cathode layers 100 according to a spin coating method, it may be confirmed that amorphous solid electrolyte layer includes an ion conductivity of about $6.98\times10^{-7}$ S/cm. A resistance of a case in which crystalline $Li_7La_3Zr_2O_{12}$ ("LLZO") powder is mixed with a precursor liquid mixture for amorphous $Li_7La_3Zr_2O_{12}$ ("LLZO") and is then arranged along the sidewall of the cathode layers 100 according to a spin coating method and a low-temperature heat treatment, for example, a heat treatment at a low temperature of 700° C. or less, for example, about 50° C. to about 700° C., about 150° C. to about 600° C., or about 350° C. to about 500° C., is performed according to an embodiment is illustrated as a graph. According to an embodiment, it may be confirmed that the electrolyte layer 300 according to an embodiment may include an ion conductivity about $1.44\times10^{-6}$ S/cm, and the electrolyte layer 300 according to an embodiment may include a relatively high ion conductivity.

Figure 7:
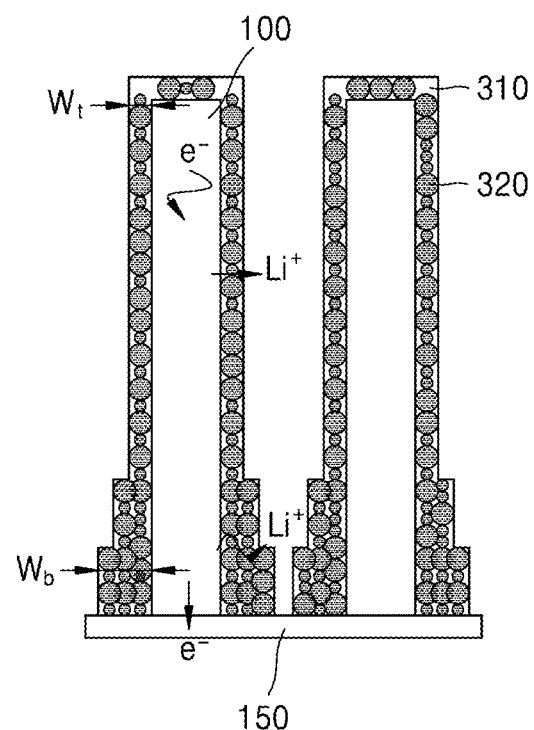
FIG. 7 is a cross-sectional view of an embodiment of cathode layers, an electrolyte layer, and a first current collecting layer.

FIG. 7 is a cross-sectional view of cathode layers 100, an electrolyte layer 300, and a first current collecting layer 150 according to an embodiment.

Referring to FIG. 7, a ratio of a thickness $W_t$ of an uppermost end of the electrolyte layer 300 with respect to a thickness $W_b$ of a lowermost end of the electrolyte layer 300 in a height direction (Z-axis direction) may be about 0.1:1 to about 1:1, or example, about 0.2:1 to about 0.9:1 about 0.3:1 to about 0.8:1, or about 0.4:1 to about 0.7:1. For example, as a distance from the first current collecting layer 150 in the height direction (Z-axis direction) increases, non-uniform charging and discharging due to electrical polarization of the cathode layers 100 may occur. For example, when an NCA or NCM material of $LiCo_{1-x}M_xO_{12}$, in which Ni, Mn, Al, or the like having low electrical conductivity replaces a Co position, is included as a cathode active material included in the cathode layers 100, over-charging may occur at lower portions of the cathode layers 100 adjacent to the first current collecting layer 150, and degradation such as a phase change caused by the over-charging may occur. To decrease or prevent degradation from occurring due to over-charging, a thickness $W_b$ of a lowermost portion of the electrolyte layer 300 surrounding the cathode layers 100 may be formed to be greater than a thickness $W_t$ of an uppermost portion of the electrolyte layer 300. When the thickness $W_b$ of the lowermost portion of the electrolyte layer 300 is formed to be greater than the thickness $W_t$ of the uppermost portion of the electrolyte layer 300, delithiation polarization may be formed in respective lower portions of the cathode layers 100, and accordingly, uniform charging and discharging may be possible in respective upper and lower portions of the cathode layers 100. As used herein, an uppermost end of the electrolyte layer 300 refers to an end of the electrolyte layer 300 that is farther from the cathode current collector 150 than is a lowermost end of the electrolyte layer 300 in a second direction, e.g., Z-axis direction, perpendicular to the first direction, e.g., X-axis direction.

Figure 8:
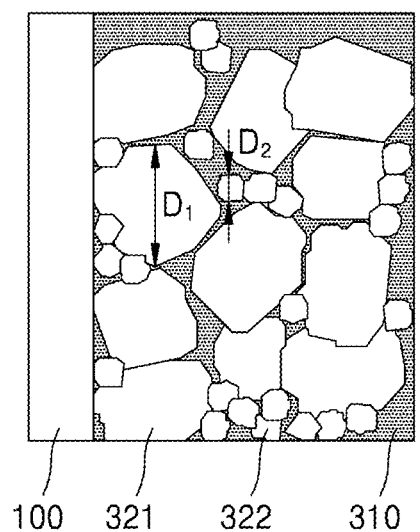
FIG. 8 is a cross-sectional view of an embodiment of cathode layers and an electrolyte layer.
Figure 9A:
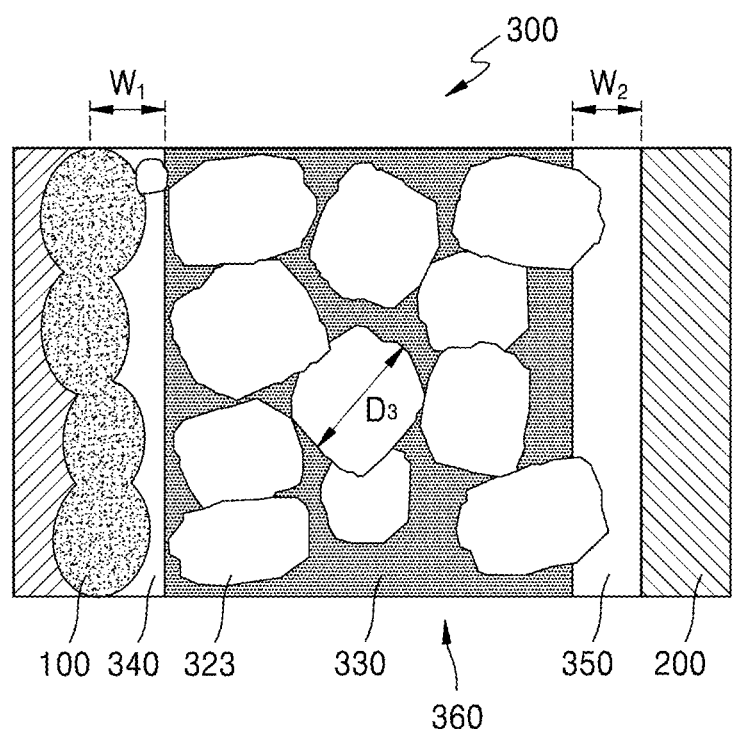
FIG. 9A is a cross-sectional view of an embodiment of cathode layers, an electrolyte layer, and an anode layer.
Figure 9B:
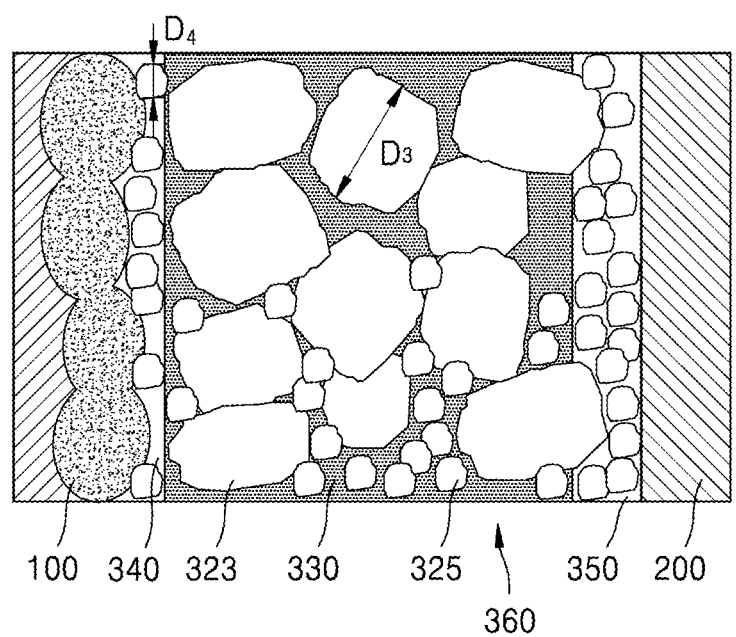
FIG. 9B is a cross-sectional view of an embodiment of cathode layers, an electrolyte layer, and an anode layer.

FIG. 8 is a cross-sectional view of cathode layers 100 and an electrolyte layer 300 according to an embodiment. FIG. 9A is a cross-sectional view of cathode layers 100, an electrolyte layer 300, and an anode layer 200 according to an embodiment. FIG. 9B is a cross-sectional view of cathode layers 100, an electrolyte layer 300, and an anode layer 200 according to an embodiment.

As described herein, the electrolyte layer 300 according to an embodiment may include solid electrolyte materials, namely, the amorphous solid electrolyte material 310 and the plurality of crystalline solid electrolyte materials 320. For example, uniformity and the like of the electrolyte layer 300 may be changed by changing the type of the crystalline solid electrolyte materials 320 or the thickness or the like of the amorphous solid electrolyte material 310.

Referring to FIG. 8, the electrolyte layer 300 may include a plurality of crystalline solid electrolyte materials having different particle sizes from each other. For example, the electrolyte layer 300 may include first crystalline solid electrolyte materials 321 and second crystalline solid electrolyte materials 322, and the first crystalline solid electrolyte materials 321 and the second crystalline solid electrolyte materials 322 may be formed of the same material. However, the first crystalline solid electrolyte materials 321 and the second crystalline solid electrolyte materials 322 may be formed of different materials. For example, the electrolyte layer 300 may include first crystalline solid electrolyte materials 321 including a first average particle size $D_1$ and second crystalline solid electrolyte materials 322 having a second average particle size $D_2$. For example, the second average particle size $D_2$ of the second crystalline solid electrolyte materials 322 with respect to the first average particle size $D_1$ of the first crystalline solid electrolyte materials 321 may be about 0.05 to about 0.5, or example, about 0.06 to about 0.45, about 0.07 to about 0.40, about 0.08 to about 0.35, about 0.09 to about 0.30, about 0.10 to about 0.25, or about 0.11 to about 0.20. When the first crystalline solid electrolyte materials 321 and the second crystalline solid electrolyte materials 322 having different average particle sizes as described herein are mixed and arranged, the second crystalline solid electrolyte materials 322 having a relatively small average particle size may be arranged between the first crystalline solid electrolyte materials 321 having a relatively large average particle size. Accordingly, the second crystalline solid electrolyte materials 322 between the first crystalline solid electrolyte materials 321 may connect the first crystalline solid electrolyte materials 321 to each other to thereby reduce interfacial resistance.

Referring to FIG. 9A, the electrolyte layer 300 may include a first amorphous solid electrolyte material layer 340 surrounding the cathode layers 100, a mixed solid electrolyte material layer 360 surrounding the first amorphous solid electrolyte material layer 340 and obtained by mixing a plurality of third crystalline solid electrolyte materials 323 in a second amorphous solid electrolyte material 330, and a third amorphous solid electrolyte material layer 350 surrounding the mixed solid electrolyte material layer 360.

When the electrolyte layer 300 including the crystalline solid electrolyte materials 320 is arranged along the sidewalls of the cathode layers 100 arranged perpendicular to the first current collecting layer 150 as shown in FIG. 1B and FIG. 1C, it may be difficult for the electrolyte layer 300 to be uniformly arranged along the sidewalls of the cathode layers 100, due to gravity and a difficulty in a pressing process. When non-uniform arrangements between the cathode layers 100 and the electrolyte layer 300 and between the electrolyte layer 300 and the anode layer 200 are generated and openings are generated, a secondary battery may be non-uniformly charged and discharged. An electrolyte layer 300 having a multi-layered structure may be formed for uniform contact between the cathode layers 100, the electrolyte layer 300, and the anode layer 200.

As described herein, the first amorphous solid electrolyte material layer 340 of the electrolyte layer 300, which may surround the cathode layers 100, may not include a crystalline solid electrolyte material. Accordingly, openings that may be generated in contact surfaces between the cathode layers 100 and the first amorphous solid electrolyte material layer 340 may be minimized. The third amorphous solid electrolyte material layer 350 that may be surrounded by the anode layer 200 may not include a crystalline solid electrolyte material. Accordingly, openings that may be generated in contact surfaces between the anode layer 200 and the third amorphous solid electrolyte material layer 350 may be minimized.

The mixed solid electrolyte material layer 360 may be arranged between the first amorphous solid electrolyte material layer 340 and the third amorphous solid electrolyte material layer 350 such that the plurality of third crystalline solid electrolyte materials 323 are mixed in the second amorphous solid electrolyte material 330. A ratio of an average particle size $D_3$ of the plurality of third crystalline solid electrolyte materials 323 to a thickness $W_1$ of the first amorphous solid electrolyte material layer 340 may be about 0.5:1 to about 1:1, for example, about 0.55:1 to about 0.95:1, about 0.60:1 to about 0.90:1, or about 0.65:1 to about 0.85:1. A ratio of the average particle size $D_3$ of the plurality of third crystalline solid electrolyte materials 323 to a thickness $W_2$ of the third amorphous solid electrolyte material layer 350 may be about 0.5:1 to about 1:1, for example, about 0.55:1 to about 0.95:1, about 0.60:1 to about 0.90:1, or about 0.65:1 to about 0.85:1. The mixed solid electrolyte material layer 360 may be arranged between the first amorphous solid electrolyte material layer 340 and the third amorphous solid electrolyte material layer 350 as described herein, and ion conductivity of the electrolyte layer 300 may be improved. The electrolyte layer 300 may have a multi-layered structure as described herein, openings of the electrolyte layer 300 for the cathode layers 100 and the anode layer 200 may be minimized, and ion conductivity may be improved.

Referring to FIG. 9B, the electrolyte layer 300 may include a first amorphous solid electrolyte material layer 340 surrounding the cathode layers 100, a mixed solid electrolyte material layer 360 surrounding the first amorphous solid electrolyte material layer 340 and obtained by mixing a plurality of third crystalline solid electrolyte materials 323 in a second amorphous solid electrolyte material 330, a third amorphous solid electrolyte material layer 350 surrounding the mixed solid electrolyte material layer 360, and a plurality of fourth crystalline solid electrolyte materials 325 arranged within at least one of the first amorphous solid electrolyte material layer 340, the second amorphous solid electrolyte material 330, or the third amorphous solid electrolyte material layer 350.

For example, the third crystalline solid electrolyte materials 323 and the fourth crystalline solid electrolyte materials 325 may be the same materials. However, the third crystalline solid electrolyte materials 323 and the fourth crystalline solid electrolyte materials 325 may be different materials. For example, the third crystalline solid electrolyte materials 323 may have a third average particle size $D_3$, and the fourth crystalline solid electrolyte materials 325 may have a fourth average particle size $D_4$. For example, the fourth average particle size $D_4$ of the fourth crystalline solid electrolyte materials 325 with respect to the third average particle size $D_3$ of the third crystalline solid electrolyte materials 323 may be about 0.05 to about 0.3, for example, about 0.06:1 to about 0.25:1, about 0.07:1 to about 0.20:1, or about 0.08:1 to about 0.15:1. When the third crystalline solid electrolyte materials 323 and the fourth crystalline solid electrolyte materials 325 having different average particle sizes as described herein are mixed and arranged, the fourth crystalline solid electrolyte materials 325 having a relatively small average particle size may be arranged between the third crystalline solid electrolyte materials 323 having a relatively large average particle size. The fourth crystalline solid electrolyte materials 325 between the third crystalline solid electrolyte materials 323 may connect the third crystalline solid electrolyte materials 323 to each other to thereby reduce interfacial resistance.

When the fourth crystalline solid electrolyte materials 325 having a relatively small average particle size is arranged between the first amorphous solid electrolyte material layer 340 and the second amorphous solid electrolyte material layer 330, a relatively constant surface uniformity of the electrolyte layer 300 facing the cathode layers 100 and the anode layer 200 may be maintained, and generation of an opening between the cathode layers 100 and the anode layer 200 and the electrolyte layer 300 may be decreased or prevented. In addition, the fourth crystalline solid electrolyte materials 325 may be arranged between the first amorphous solid electrolyte material layer 340 and the second amorphous solid electrolyte material layer 330, and ion conductivity may be improved.

FIGS. 10A through 10J are views for illustrating a method of manufacturing a secondary battery, according to an embodiment.

Figure 10A:
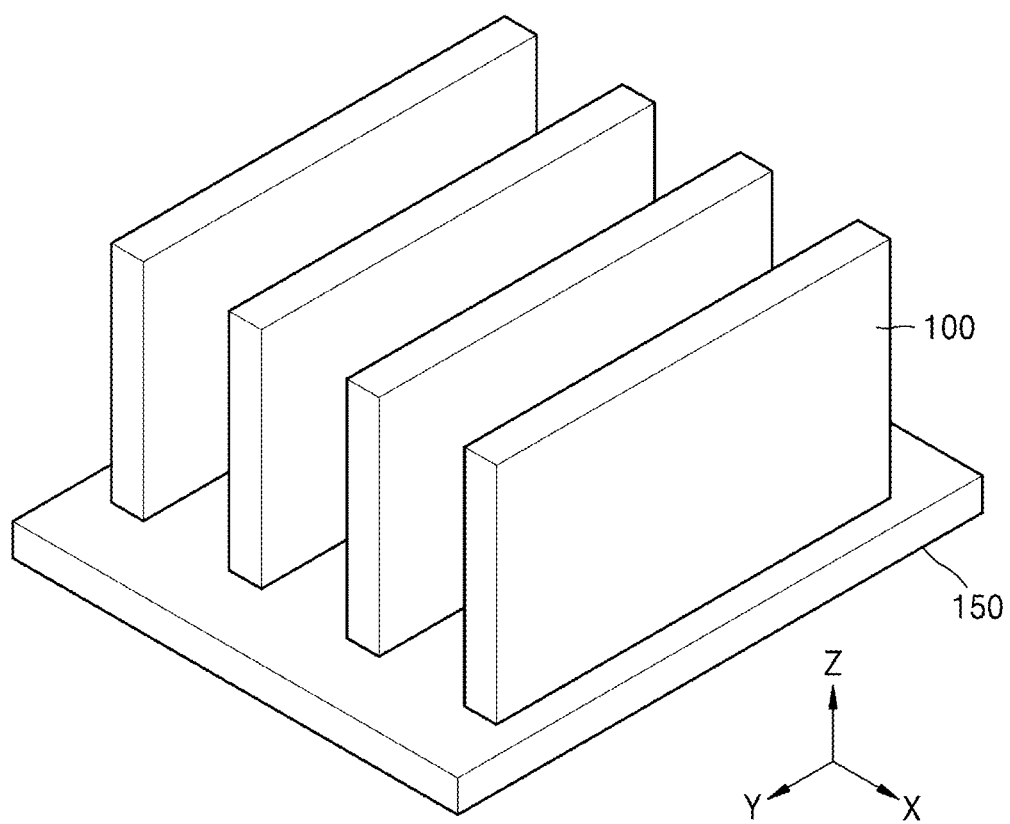
FIGS. 10A through 10J are views for illustrating an embodiment of a method of manufacturing a secondary battery.

Referring to FIG. 10A, the first electrode structure E1 may be provided by arranging a plurality of cathode layers 100 having a flat plate-shape on the first current collecting layer 150. For example, the first electrode structure E1 has a structure corresponding to the first electrode structure E1 of FIG. 1A, and the cathode layers 100 may be formed by drying active material slurry to form an active material sheet and sintering a cathode active material included in the active material sheet via a sintering process. The active material slurry may be manufactured by mixing, for example, a cathode active material (powder), a binder, a dispersing agent, a plasticizer, etc. with a solvent. The mixing may be performed using a grinder, such as a ball mill, or a mixing apparatus.

Figure 10B:
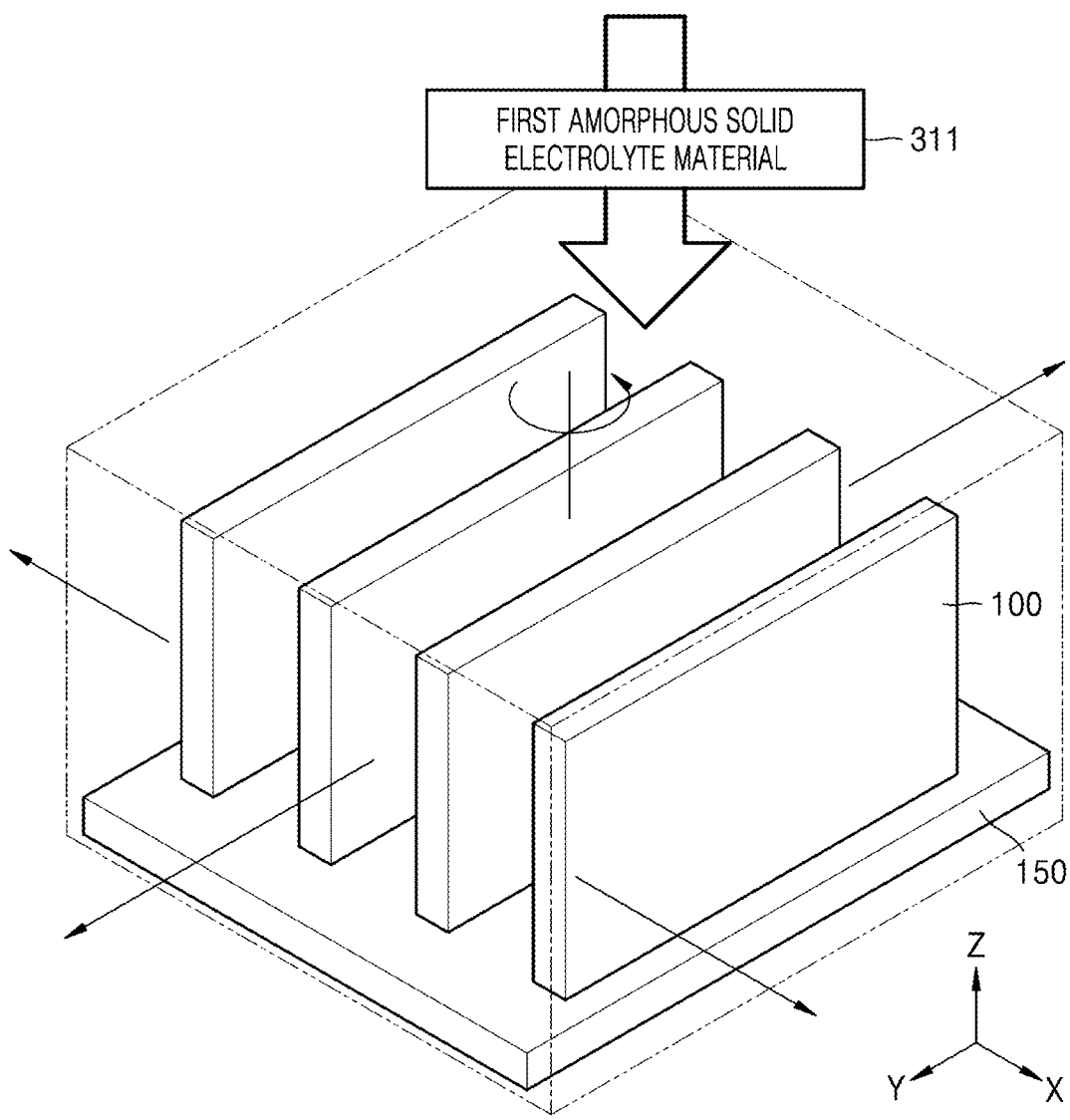
Figure 10C:
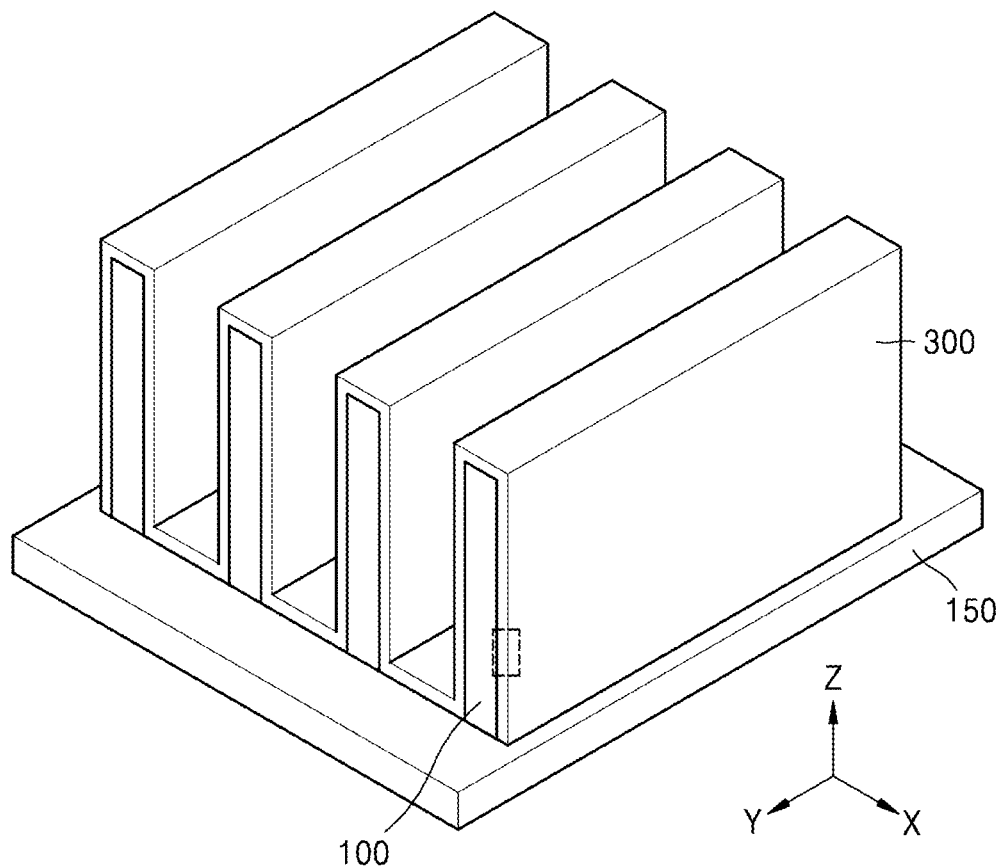
Figure 10D:
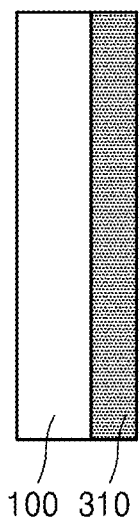

Next, referring to FIG. 10B, FIG. 10C, and FIG. 10D, after coating a first amorphous solid electrolyte material 311 on the first electrode structure E1, the electrolyte layer 300 may be formed by using a spin process. For example, the first amorphous solid electrolyte material 311 may be a solid electrolyte, for example, a precursor liquid mixture for amorphous $Li_7La_3Zr_2O_{12}$ ("LLZO"), and the first amorphous solid electrolyte material 311 may be in the form of a sol. A 3D electrode structure may have an open-type structure in which the plurality of cathode layers 100 are spaced apart in a widthwise direction and a lengthwise direction, and the first amorphous solid electrolyte material 311 may be readily formed by spin coating.

After coating the first amorphous solid electrolyte material 311, the first amorphous solid electrolyte material 311 may undergo a first heat treatment. The first heat treatment may be performed in a pressing state and at a low temperature of about 700° C. or less, for example, about 50° C. to about 700° C., about 150° C. to about 600° C., or about 350° C. to about 500° C., and an interfacial resistance may be reduced without damage to the cathode layers 100 and accordingly, ion conductivity may be improved.

Figure 10E:
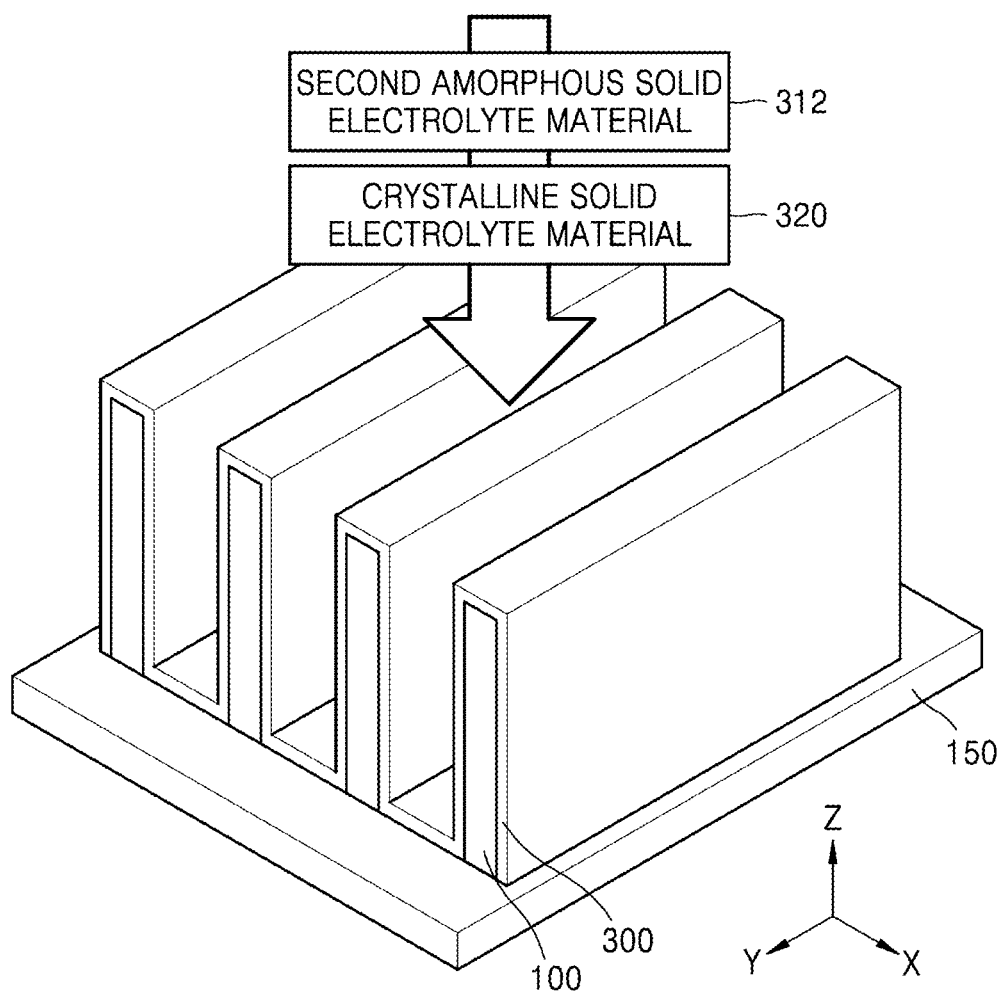
Figure 10F:
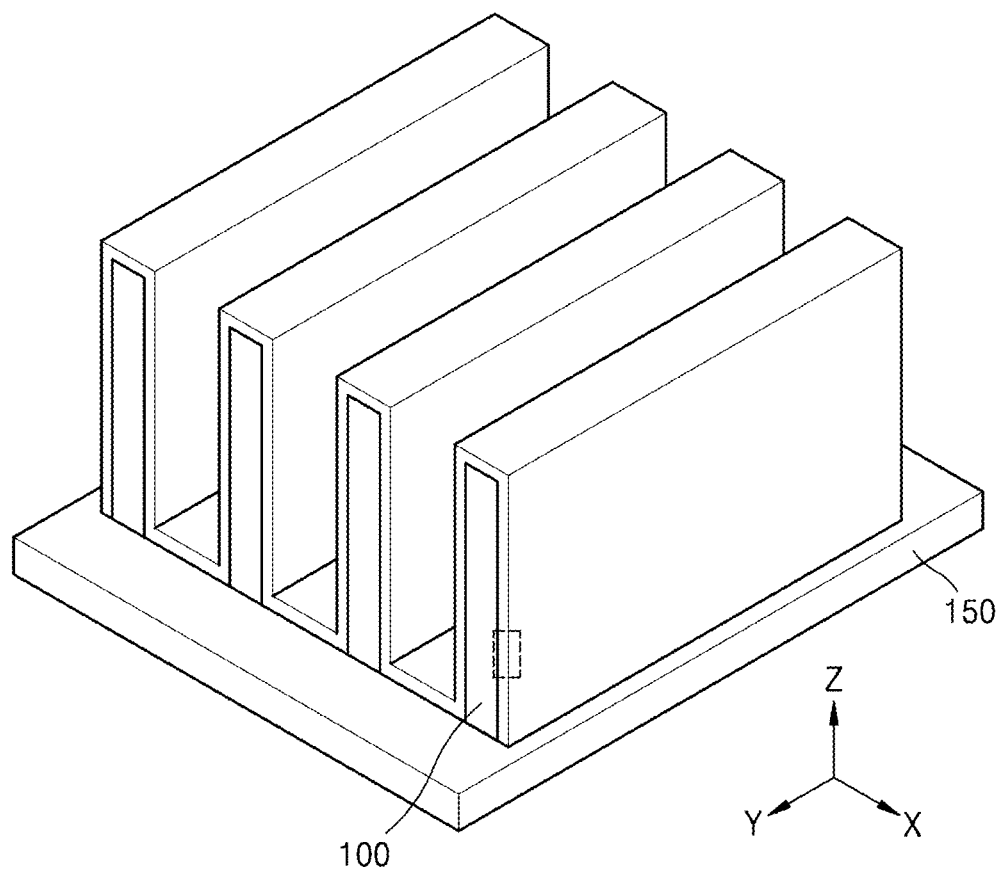
Figure 10G:
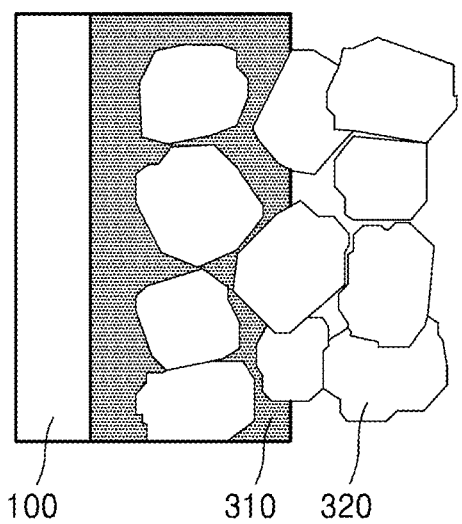

Next, referring to FIG. 10E, FIG. 10F, and FIG. 10G, after coating a second amorphous solid electrolyte material 312 and a plurality of crystalline solid electrolyte materials 320 on the first electrode structure E1, the electrolyte layer 300 may be formed by using a spin process. For example, the second amorphous solid electrolyte material 312 may be a solid electrolyte, for example, a precursor liquid mixture for amorphous LLZO, and the plurality of crystalline solid electrolyte materials 320 may be crystalline LLZO powder. The second amorphous solid electrolyte material 312 may be in the form of a sol, and the plurality of crystalline solid electrolyte materials 320 may be mixed within the second amorphous solid electrolyte material 312. A 3D electrode structure may have an open-type structure in which the plurality of cathode layers 100 are spaced apart in a widthwise direction and a lengthwise direction, and the second amorphous solid electrolyte material 312 and the plurality of crystalline solid electrolyte materials 320 may be readily formed by spin coating. By coating the second amorphous solid electrolyte material 312 and the plurality of crystalline solid electrolyte materials 320, a structure in which the plurality of crystalline solid electrolyte materials 320 and the amorphous solid electrolyte material 310 are mixed may be formed as shown in FIG. 10F and FIG. 10G.

After coating the second amorphous solid electrolyte material 312 and the plurality of crystalline solid electrolyte materials 320, the second amorphous solid electrolyte material 312 and the plurality of crystalline solid electrolyte materials 320 may undergo a second heat treatment. The second heat treatment may be performed in a pressing state and at a low temperature of 700° C. or less, for example, about 50° C. to about 700° C., about 150° C. to about 600° C., or about 350° C. to about 500° C., and an interfacial resistance between the amorphous solid electrolyte material 310 and the plurality of crystalline solid electrolyte materials 320 may be reduced without damage to the cathode layers 100 and accordingly, ion conductivity may be improved.

Figure 10H:
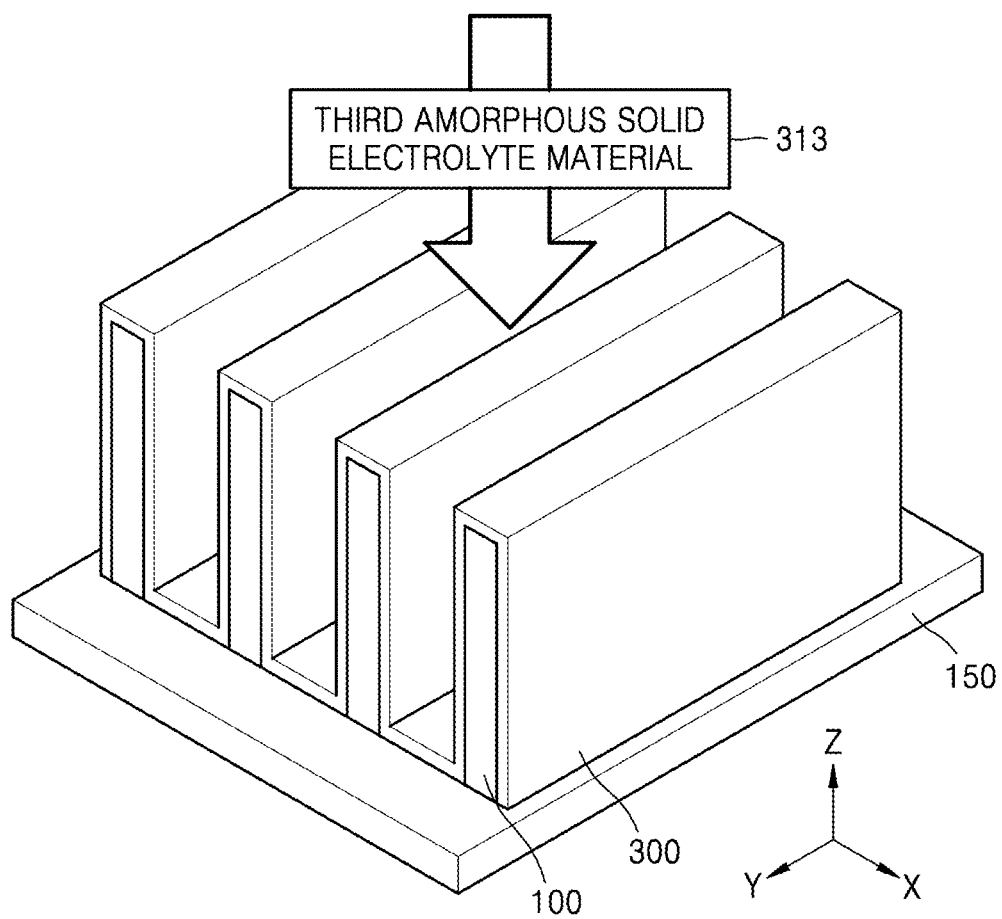
Figure 10I:
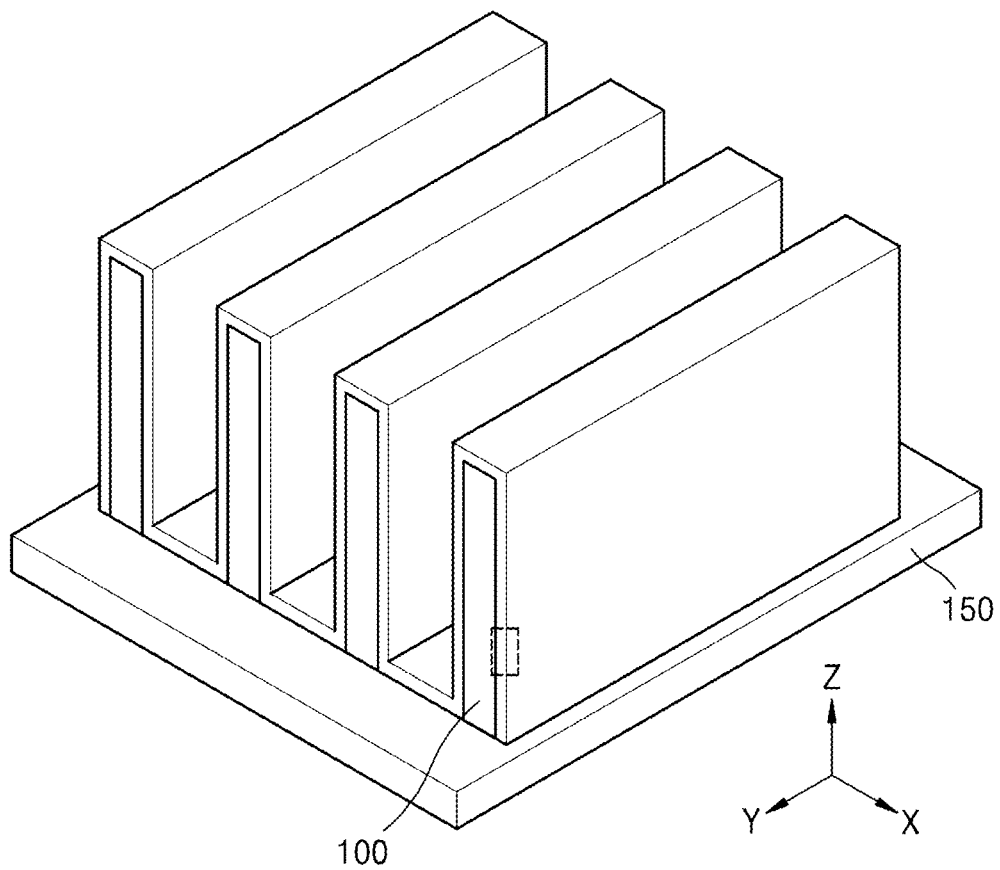
Figure 10J:
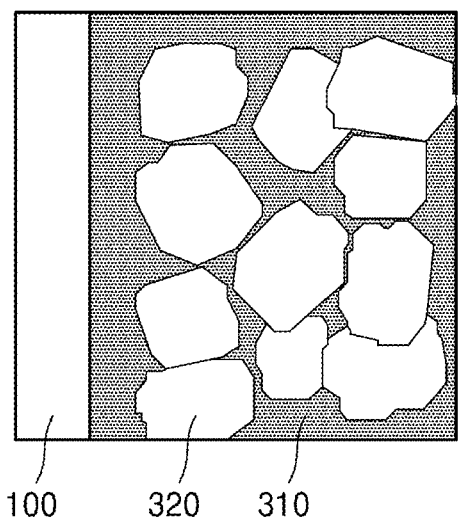

Next, referring to FIG. 10H, FIG. 10I, and FIG. 10J, after coating a third amorphous solid electrolyte material 313 on the first electrode structure E1, the electrolyte layer 300 may be formed by using a spin process. For example, the third amorphous solid electrolyte material 313 may be a solid electrolyte, for example, a precursor liquid mixture for amorphous LLZO and may be in the form of a sol. The third amorphous solid electrolyte material 313 may be coated on the plurality of crystalline solid electrolyte materials 320, and the plurality of crystalline solid electrolyte materials 320 may be arranged to be mixed in the amorphous solid electrolyte material 310, as shown in FIG. 10I and FIG. 10J.

After the coating of the third amorphous solid electrolyte material 313, the third amorphous solid electrolyte material 313 may undergo a third heat treatment. The third heat treatment may be performed in a pressing state and at a low temperature of 700° C. or less, for example, about 50° C. to about 700° C., about 150° C. to about 600° C., or about 350° C. to about 500° C., and an interfacial resistance between the amorphous solid electrolyte material 310 and the plurality of crystalline solid electrolyte materials 320 may be reduced without damage to the cathode layers 100 and accordingly, ion conductivity may be improved.

Although the first amorphous solid electrolyte material 311, a mixture of the second amorphous solid electrolyte material 312 and the plurality of crystalline solid electrolyte materials 320, and the third amorphous solid electrolyte materials 313 have been described herein as being formed by spin coating, dip coating may be used instead of spin coating. The amorphous solid electrolyte material 310 may be formed by using a deposition method such as atomic layer deposition ("ALD"), chemical vapor deposition ("CVD"), or physical vapor deposition ("PVD"). Coating of the first amorphous solid electrolyte material 311 may be performed using a layer by layer ("LBL") method a plurality of number of times, for example, two to five times.

Next, the secondary battery 10 according to an embodiment may be manufactured by sequentially forming the anode layer 200 and the second current collecting layer 250 on the electrolyte layer 300, the anode layer 200 including an anode active material. For example, the anode active material included in the anode layer 200 may include, for example, a Li metal, a carbon-based material, a silicon-based material, or an oxide. The second current collecting layer 250 may include, for example, at least one conductive material of Cu, Au, Pt, Ag, Zn, Al, Mg, Ti, Fe, Co, Ni, Ge, In, or Pd. For example, the anode layer 200 may be formed by coating the anode active material on the electrolyte layer 300. The second current collecting layer 250 may be provided to face the first current collecting layer 150. The secondary battery 10 may be, for example, a Li secondary battery.

A secondary battery including a cathode layer and an electrolyte layer in which an ion readily moves may be provided. A secondary battery having no capacity reduction even at a high rate may be provided. A secondary battery usefully applicable to various electronic devices including mobile devices and wearable devices may be provided.

It should be understood that embodiments described herein should be considered in a descriptive sense only and not for purposes of limitation. Descriptions of features or aspects within each embodiment should be considered as available for other similar features or aspects in other embodiments. While the present invention has been particularly shown and described with reference to exemplary embodiments thereof, it will be understood by those of ordinary skill in the art that various changes in form and details may be made therein without departing from the spirit and scope of the following claims.

What is claimed is:

1. A solid electrolyte-cathode assembly for a secondary battery comprising:
    a plurality of cathode layers spaced apart from each other in a first direction; and
    an electrolyte layer comprising
       an amorphous solid electrolyte, and
       a crystalline solid electrolyte comprising a plurality of crystalline solid electrolyte particles,
       wherein the amorphous solid electrolyte is on a surface of a cathode layer of the plurality of cathode layers and the crystalline solid electrolyte is within the amorphous solid electrolyte,
       wherein the crystalline solid electrolyte comprises first crystalline solid electrolyte particles and second crystalline solid electrolyte particles, the first and second crystalline solid electrolyte particles having different average particle sizes, and
       wherein the first crystalline solid electrolyte particles and the second crystalline solid electrolyte particles comprise different materials.

2. The solid electrolyte-cathode assembly of claim 1, wherein the crystalline solid electrolyte is present in the electrolyte layer in an amount of about 10 volume percent to about 99 volume percent, based on a total volume of the electrolyte layer.

3. The solid electrolyte-cathode assembly of claim 1, wherein a thickness of the electrolyte layer measured in the first direction is about 100 nanometers to about 100 micrometers.

4. The solid electrolyte-cathode assembly of claim 1, wherein an average particle size of the plurality of crystalline solid electrolyte particles is about 100 nanometers to about 100 micrometers.

5. A solid electrolyte-cathode assembly for a secondary battery comprising:
    a plurality of cathode layers spaced apart from each other in a first direction; and
    an electrolyte layer comprising
       an amorphous solid electrolyte, and
       a crystalline solid electrolyte comprising a plurality of crystalline solid electrolyte particles,
       wherein the amorphous solid electrolyte is on a surface of a cathode layer of the plurality of cathode layers and the crystalline solid electrolyte is within the amorphous solid electrolyte, and
       wherein a ratio of an average particle size of the plurality of crystalline solid electrolyte particles to a thickness of the electrolyte layer measured in the first direction is about 0.15:1 to about 0.25:1.

6. The solid electrolyte-cathode assembly of claim 1, further comprising:
    a cathode current collector facing an end of each of the plurality of cathode layers and contacting a portion of each of the plurality of cathode layers,
    wherein the surface of the cathode layer of the plurality of cathode layers on which the amorphous solid electrolyte is present differs from the end of each of the plurality of cathode layers facing the cathode current collector.

7. The solid electrolyte-cathode assembly of claim 1, wherein each of the plurality of cathode layers comprises
    a first surface and a second surface opposite to each other, and
    a third surface and a fourth surface, each extending between the first surface and the second surface, wherein each of the third surface and the fourth surface has a surface area that is less than a surface area of each of the first surface and the second surface,
    wherein the third surface and the fourth surface are opposite to each other, and
    wherein a first surface of a first cathode layer and a second surface of a second cathode layer adjacent to the first cathode layer face each other.

8. The solid electrolyte-cathode assembly of claim 7, wherein the electrolyte layer is on the first surface and the second surface of each of the plurality of cathode layers.

9. A solid electrolyte-cathode assembly for a secondary battery comprising:
    a plurality of cathode layers spaced apart from each other in a first direction; and
    an electrolyte layer comprising
       an amorphous solid electrolyte, and
       a crystalline solid electrolyte comprising a plurality of crystalline solid electrolyte particles,
       wherein the amorphous solid electrolyte is on a surface of a cathode layer of the plurality of cathode layers and the crystalline solid electrolyte is within the amorphous solid electrolyte, and
    wherein
    a ratio of a thickness of a first portion of the electrolyte layer measured in the first direction to a thickness of a second portion of the electrolyte layer measured in the first direction is about 0.1:1 to about 1:1,
    the solid electrolyte-cathode assembly further comprises a cathode current collector on which the plurality of cathode layers are arranged, and
    the first portion of the electrolyte layer is farther from the cathode current collector than is the second portion of the electrolyte layer in a second direction perpendicular to the first direction.

10. The solid electrolyte-cathode assembly of claim 1, wherein
a ratio of an average particle size of the first crystalline solid electrolyte particles to an average particle size of the second crystalline solid electrolyte particles is about 0.05:1 to about 0.5:1.

11. The solid electrolyte-cathode assembly of claim 1, wherein an ion conductivity of the electrolyte layer is about $10^{-6}$ Siemens per centimeter to about $10^{-4}$ Siemens per centimeter.

12. The solid electrolyte-cathode assembly of claim 1, wherein the electrolyte layer is product of heat treating at a temperature of about 50° C. to about 700° C.

13. The solid electrolyte-cathode assembly of claim 9, wherein the crystalline solid electrolyte comprises $Li_{3+x}La_3M_2O_{12}$, wherein M is at least one of Te, Nb, or Zr, and $0 \le x \le 10$.

14. The solid electrolyte-cathode assembly of claim 9, wherein the amorphous solid electrolyte comprises $Li_{3+x}La_3M_2O_{12}$, wherein M is at least one of Te, Nb, or Zr, and $0 \le x \le 10$.

15. A secondary battery comprising:
an anode layer on the solid electrolyte-cathode assembly of claim 7; and
an anode current collector contacting a portion of the anode layer and facing the cathode current collector,
wherein the anode layer is on the first surface and the second surface of each of the plurality of cathode layers.

16. A solid electrolyte-cathode assembly comprising:
a plurality of cathode layers spaced apart from each other in a first direction; and
an electrolyte layer on a surface of a cathode layer of the plurality of cathode layers;
wherein the electrolyte layer comprises:
a first amorphous solid electrolyte layer on a cathode layer of the plurality of cathode layers;
a mixed solid electrolyte layer on the first amorphous solid electrolyte layer, the mixed solid electrolyte layer comprising a plurality of third crystalline solid electrolyte particles in a second amorphous solid electrolyte; and
a third amorphous solid electrolyte layer on the mixed solid electrolyte layer.

17. The solid electrolyte-cathode assembly of claim 16, wherein a ratio of an average particle size of the plurality of third crystalline solid electrolyte particles to a thickness of a sum of the first amorphous solid electrolyte layer and the third amorphous solid electrolyte layer measured in the first direction is about 0.5:1 to about 1:1.

18. The solid electrolyte-cathode assembly of claim 16, wherein a plurality of fourth crystalline solid electrolyte particles are in at least one of the first amorphous solid electrolyte layer, the mixed solid electrolyte layer, or the third amorphous solid electrolyte layer.

19. The solid electrolyte-cathode assembly of claim 18, wherein a ratio of an average particle size of the plurality of fourth crystalline solid electrolyte particles to an average particle size of the plurality of third crystalline solid electrolyte particles is about 0.05:1 to about 0.3:1.

20. A secondary battery comprising:
an anode layer on the solid electrolyte-cathode assembly of claim 16.

21. A method of manufacturing the solid electrolyte-cathode assembly for a secondary battery of claim 1, the method comprising:
arranging the plurality of cathode layers spaced apart from each other in the first direction on a cathode current collector;
coating a first amorphous solid electrolyte on a cathode layer of the plurality of cathode layers to provide a first amorphous solid electrolyte-coated cathode layer;
heat treating the first amorphous solid electrolyte-coated cathode layer to provide a second amorphous solid electrolyte-coated cathode layer;
coating a mixture of a second amorphous solid electrolyte and the crystalline solid electrolyte comprising the plurality of crystalline solid electrolyte particles on the second amorphous solid electrolyte-coated cathode layer to provide a coated mixture;
heat treating the coated mixture to provide a heat-treated mixture;
coating a third amorphous solid electrolyte on the heat-treated mixture to provide an amorphous solid electrolyte material; and
heat treating the amorphous solid electrolyte material to manufacture the solid electrolyte-cathode assembly.

22. The method of claim 21, wherein
the heat treating of the first amorphous solid electrolyte-coated cathode layer, the heat treating of the coated mixture, or the heat treating of the amorphous solid electrolyte material each independently comprise heat treating at about 50° C. to about 700° C.

23. The method of claim 22, wherein the coating of the first amorphous solid electrolyte, the mixture of the second amorphous solid electrolyte and the crystalline solid electrolyte, or the third amorphous solid electrolyte each independently comprise spin coating or dip coating.

24. A method of manufacturing a secondary battery, the method comprising:
providing an anode layer;
providing the solid electrolyte-cathode assembly of claim 1; and
disposing the anode layer on the solid electrolyte-cathode assembly to manufacture the secondary battery.

25. An electrolyte layer of a secondary battery comprising:
an amorphous solid electrolyte; and
a plurality of crystalline solid electrolyte particles,
wherein the electrolyte layer has a thickness of about 100 nanometers to about 100 micrometers,
wherein an average particle size of the plurality of crystalline solid electrolyte particles is about 100 nanometers to about 100 micrometers, and
wherein a ratio of the average particle size of the plurality of crystalline solid electrolyte particles to the thickness of the electrolyte layer is about 0.15:1 to about 0.25:1.

* * * * *